United States Patent
Newby et al.

(10) Patent No.: US 10,375,557 B2
(45) Date of Patent: Aug. 6, 2019

(54) SYSTEM AND METHOD FOR COORDINATING AN EMERGENCY RESPONSE AT A FACILITY

(71) Applicant: salesforce.com, inc., San Francisco, CA (US)

(72) Inventors: Jonathon Christopher Newby, Indianapolis, IN (US); Richard W. Spencer, West Lafayette, IN (US); Corinthe Jennelle Bailey, Oak Park, IL (US)

(73) Assignee: salesforce.com, inc., San Francisco, CA (US)

( * ) Notice: Subject to any disclaimer, the term of this patent is extended or adjusted under 35 U.S.C. 154(b) by 74 days.

(21) Appl. No.: 15/896,640

(22) Filed: Feb. 14, 2018

(65) Prior Publication Data
US 2018/0192274 A1    Jul. 5, 2018

Related U.S. Application Data

(63) Continuation of application No. 15/359,892, filed on Nov. 23, 2016, now Pat. No. 9,980,112.

(51) Int. Cl.
| | | |
|---|---|---|
| *H04W 4/02* | (2018.01) | |
| *H04W 4/90* | (2018.01) | |
| *H04W 4/04* | (2009.01) | |
| *H04W 4/021* | (2018.01) | |
| *H04W 4/33* | (2018.01) | |
| *G06Q 50/26* | (2012.01) | |

(52) U.S. Cl.
CPC ............. *H04W 4/90* (2018.02); *H04W 4/021* (2013.01); *H04W 4/043* (2013.01); *H04W 4/33* (2018.02); *G06Q 50/265* (2013.01)

(58) Field of Classification Search
CPC ...... H04W 4/22; H04W 40/20; H04L 65/1006
USPC .................... 455/404.1–2, 456.1, 456.3, 521
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |

(Continued)

*Primary Examiner* — Congvan Tran
(74) *Attorney, Agent, or Firm* — Lorenz & Kopf, LLP

(57) ABSTRACT

Systems and methods are provided in which an application at each user device monitors locations of user devices. A location of a first user device within a facility and identification information associated with a user who is associated with the first user device can be determined and a floorplan can be generated and then caused to displayed via a user interface of a second user device. The floorplan includes an icon that represents the location of the first user device.

19 Claims, 18 Drawing Sheets

(56) References Cited

U.S. PATENT DOCUMENTS

| | | |
|---|---|---|
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0208605 A1* | 8/2008 | Sinha .................. G06Q 10/10 705/1.1 |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0115623 A1* | 5/2011 | Gnanasekaran ....... G08B 21/02 340/539.26 |
| 2011/0225238 A1* | 9/2011 | Shaffer .................. H04L 63/08 709/204 |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2016/0049064 A1* | 2/2016 | McNabb ................ G08B 21/10 340/540 |
| 2016/0100302 A1* | 4/2016 | Barash .................. H04W 4/90 455/404.2 |
| 2016/0147919 A1* | 5/2016 | Yabe .................. H04L 12/2816 700/275 |
| 2016/0192166 A1* | 6/2016 | deCharms ............ H04W 4/021 348/14.02 |
| 2017/0339741 A1* | 11/2017 | K .......................... H04W 4/90 |

\* cited by examiner

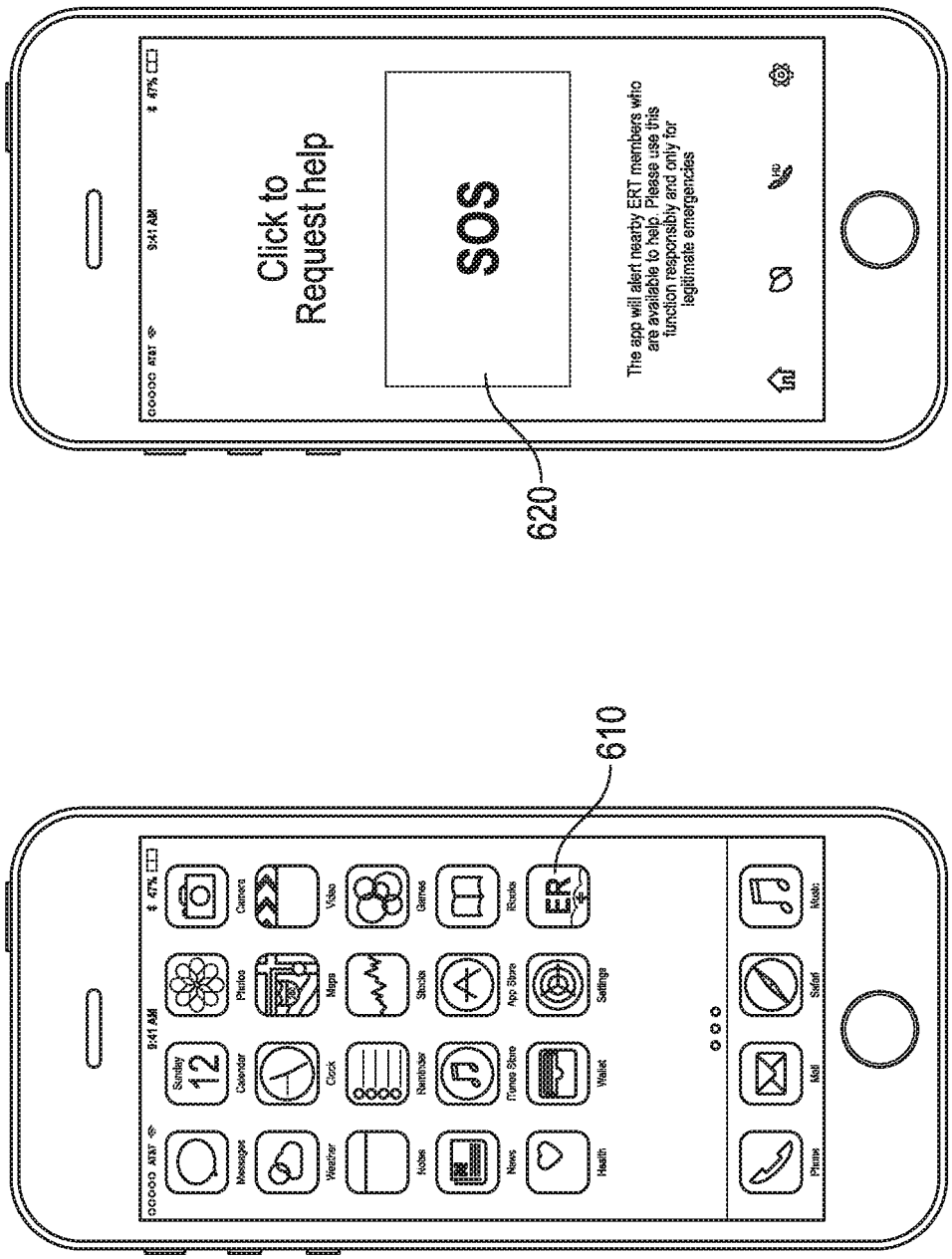

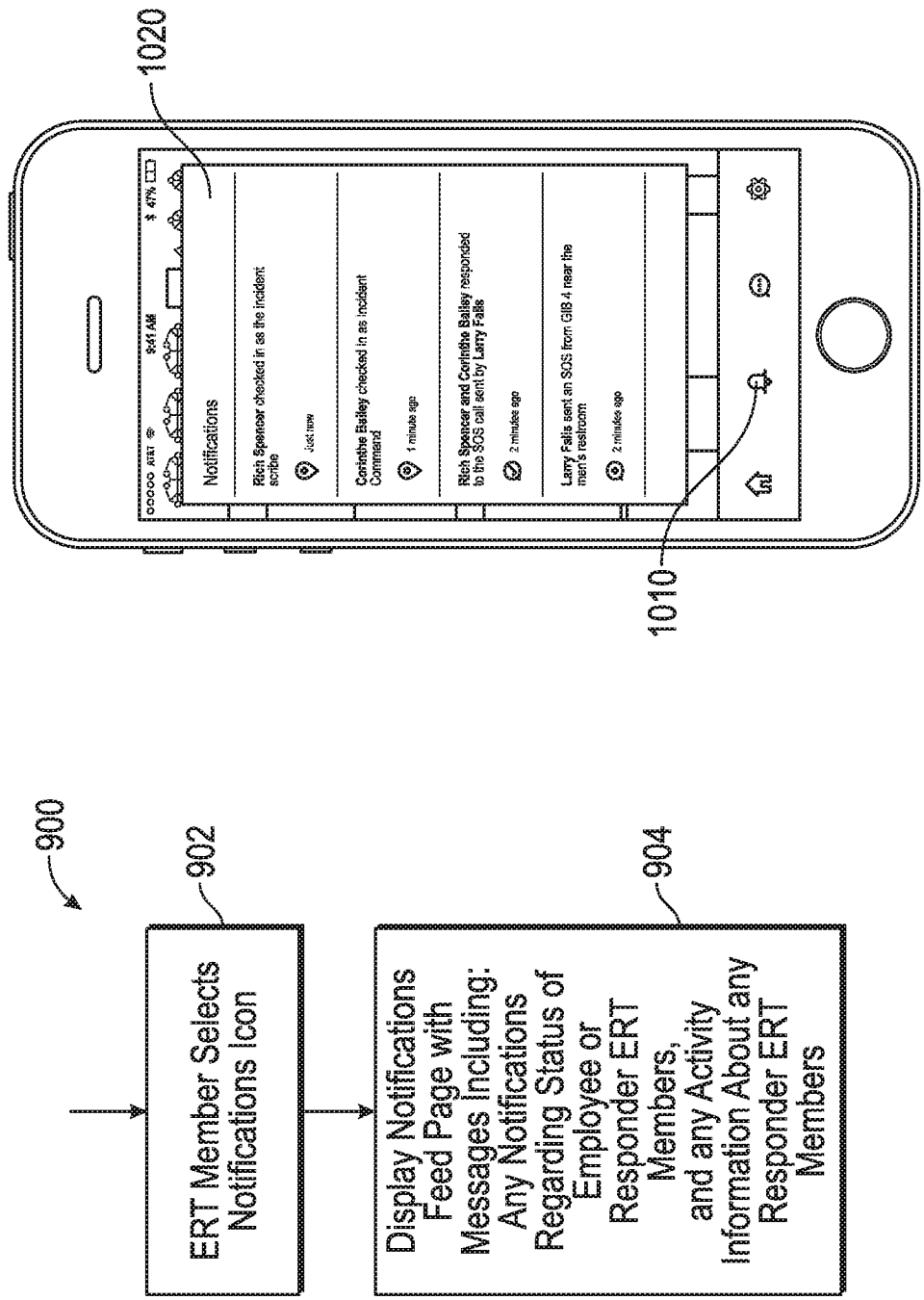

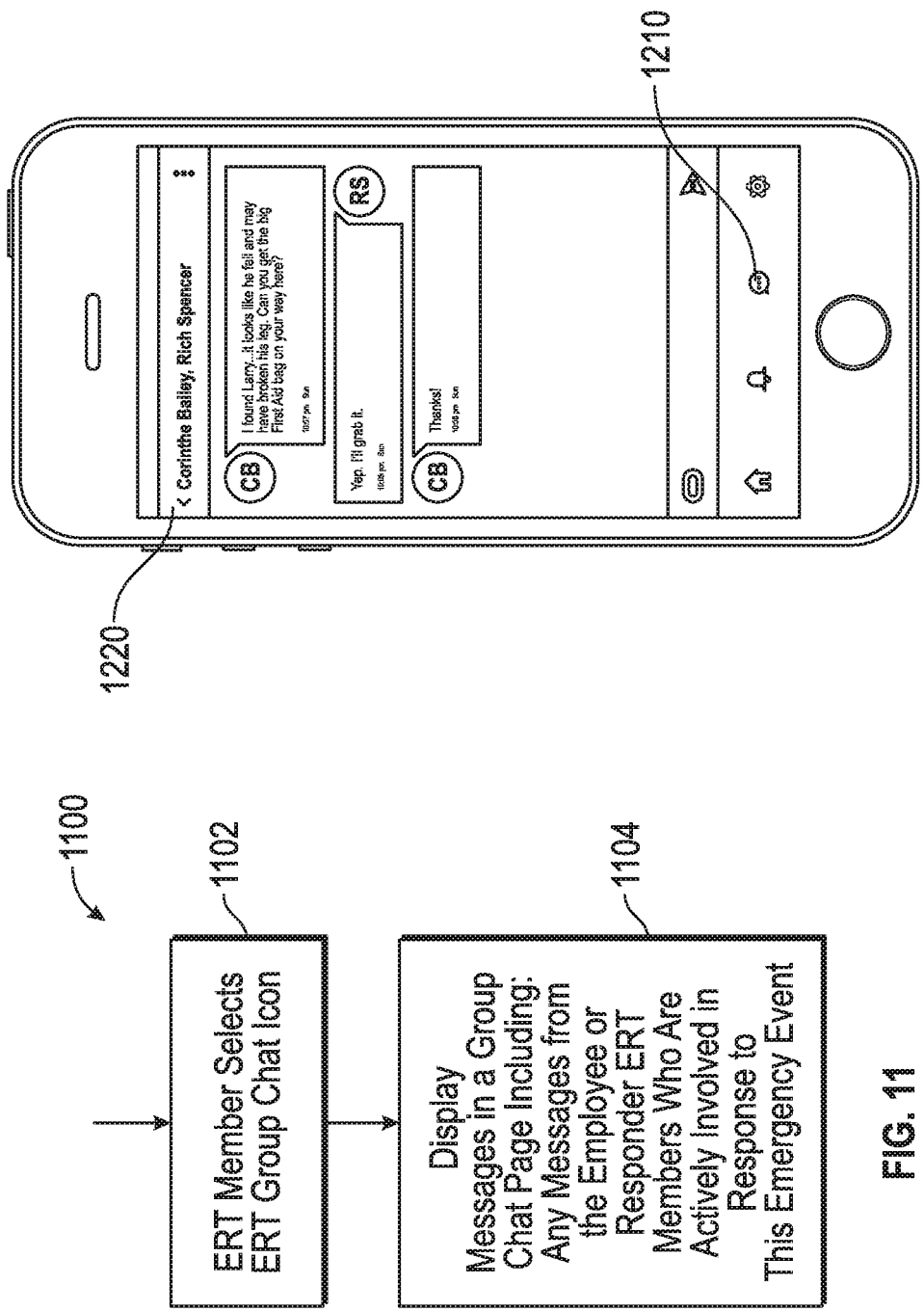

SYSTEM AND METHOD FOR COORDINATING AN EMERGENCY RESPONSE AT A FACILITY

CROSS-REFERENCE TO RELATED APPLICATION

This application is a continuation of U.S. patent application Ser. No. 15/359,892, filed Nov. 23, 2016, which is now U.S. Pat. No. 9,980,112 B1.

TECHNICAL FIELD

Embodiments of the subject matter described herein relate generally to coordinating an emergency response at a facility, and, more particularly, to computer implemented methods, computer systems and mobile applications for coordinating an emergency response at a facility.

BACKGROUND

Many companies today have large facilities where their employees work, and it is common for employees to spend time at more than one physical location within a facility. In many cases companies have facilities that are distributed geographically, and the employees who are at a given facility can vary at any particular time.

Unexpected events such as illness, injuries, extreme weather, fires, earthquakes, gas leaks and political instability are just some of the factors that can create emergency situations or events. As such, each facility can have dedicated group of employees who are part of an Emergency Response Team (ERT). Members of the ERT act as first responders when an emergency occurs at their facility. The ERT members are trained to ensure their peers and colleagues reach safety and receive medical help if needed.

When an emergency occurs one challenge that ERT members face is communicating with other members of the ERT to execute a coordinated response (e.g., in conducting floor sweeps for building evacuations, and giving emergency medical care to any injured employees).

ERT members need to be able to communicate with employees to alert them that a potential emergency is in progress, and inform them what type of action is required on their part to reach safety. It can be difficult for employees to locate distressed employee and contact them. It can also be difficult for employees to communicate their location and safety status with ERT members, and/or request assistance in situations where they need help.

It would be desirable to provide a system that can improve communication between ERT members and employees when an emergency occurs. It would also be desirable to provide systems that can help coordinate efforts of ERT members so that ERT members can act quickly in a coordinated way. It would also be desirable to provide systems that let ERT members know each other's status and that give them the ability to request assistance if needed.

BRIEF DESCRIPTION OF THE DRAWING FIGURES

A more complete understanding of the subject matter may be derived by referring to the detailed description and claims when considered in conjunction with the following figures, wherein like reference numbers refer to similar elements throughout the figures.

FIGS. 6A through 6D that illustrate different screen shots of a user interface of a user device in accordance with an exemplary implementation of the disclosed embodiments.

Figure 7:
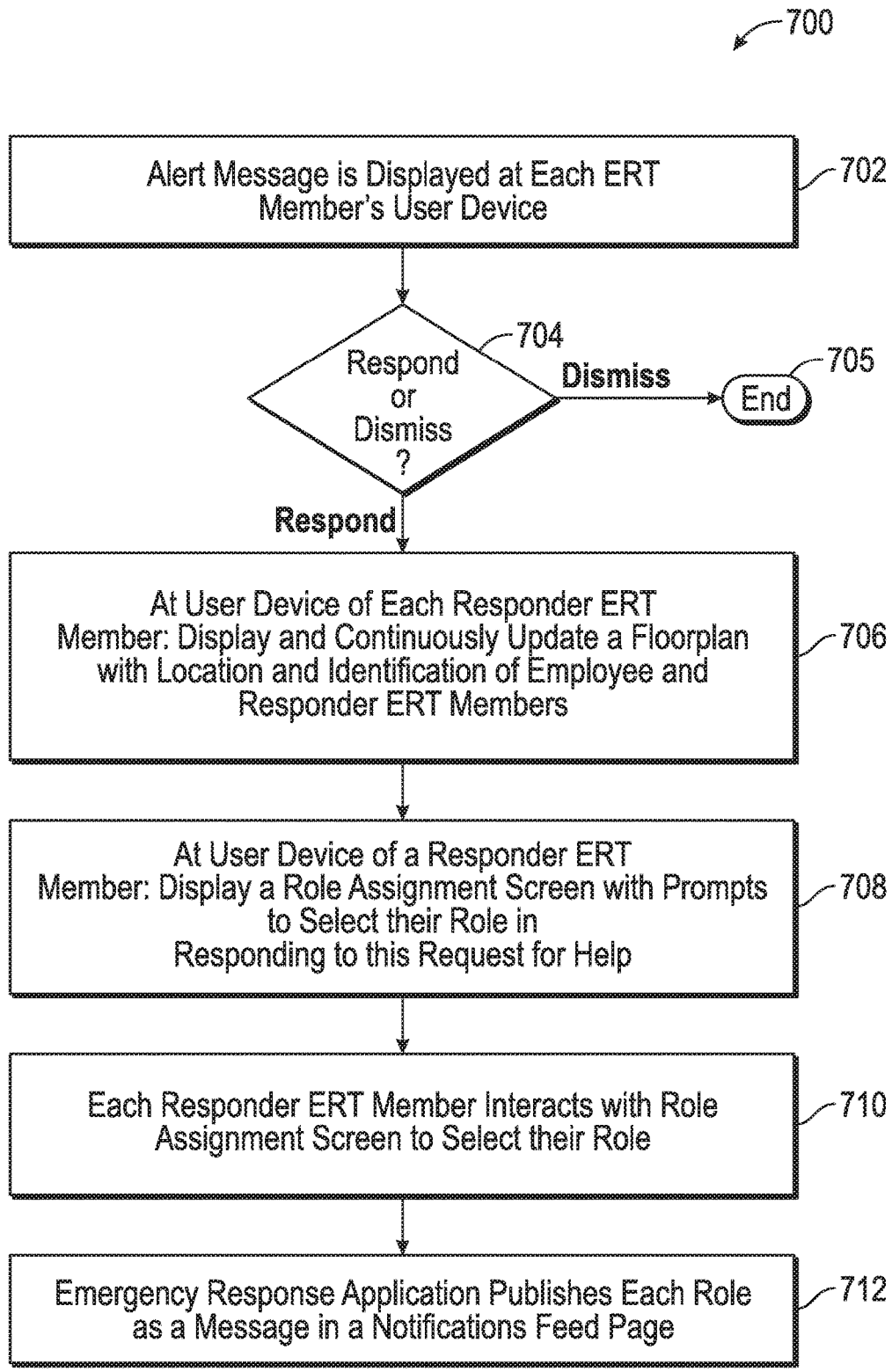

FIG. 7 is a flow diagram of an exemplary method performed by an emergency response application when members of an Emergency Response Team (ERT) receive a distress call in accordance with an embodiment.

Figures 8A, 8B, 8C:
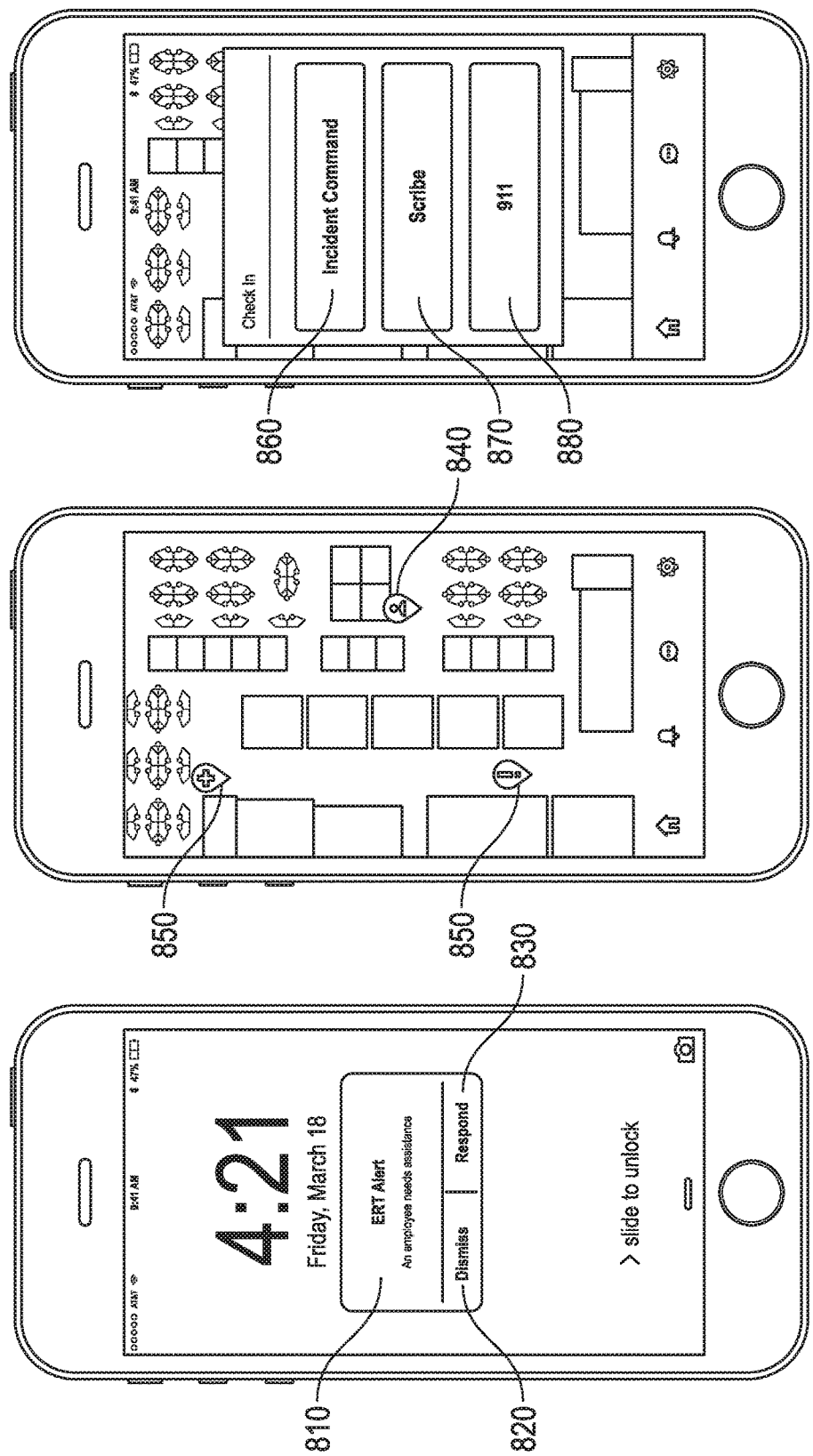

FIGS. 8A through 8C that illustrate different screen shots of a user interface of a user device in accordance with an exemplary implementation of the disclosed embodiments.

FIG. 9 is a flow diagram of an exemplary method performed by an emergency response application when an ERT member selects a notifications icon in accordance with an embodiment.

FIG. 10 that illustrates a screen shot of a user interface of a user device in accordance with an exemplary implementation of the disclosed embodiments.

FIG. 11 is a flow diagram of an exemplary method performed by an emergency response application when an ERT member selects a group chat icon in accordance with an embodiment.

FIG. 12 that illustrates a screen shot of a user interface of a user device in accordance with an exemplary implementation of the disclosed embodiments.

Figure 13:
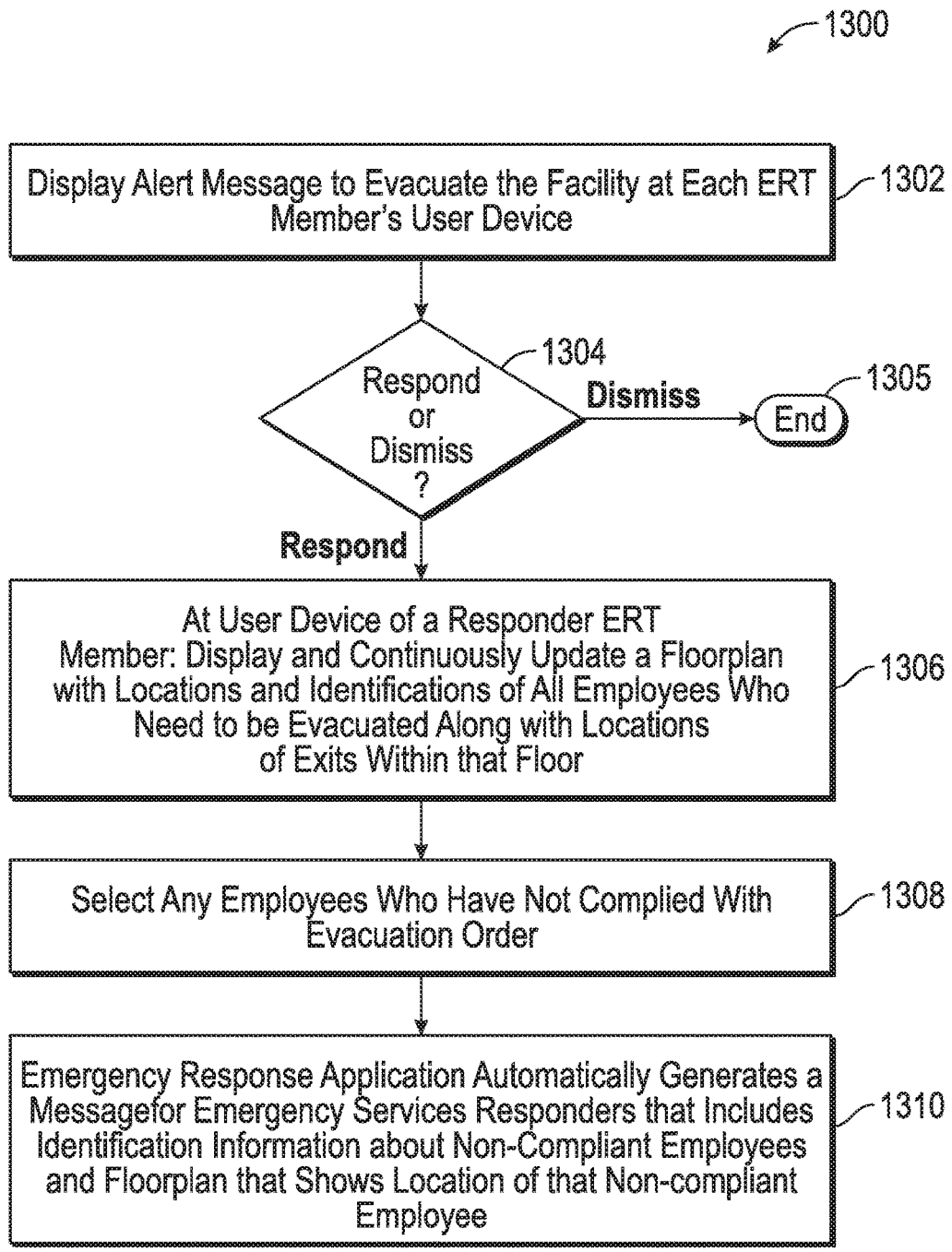

FIG. 13 is a flow diagram of an exemplary method performed by an emergency response application when an order to evacuate the facility is issued to employees including ERT members in accordance with an embodiment.

Figure 14C:
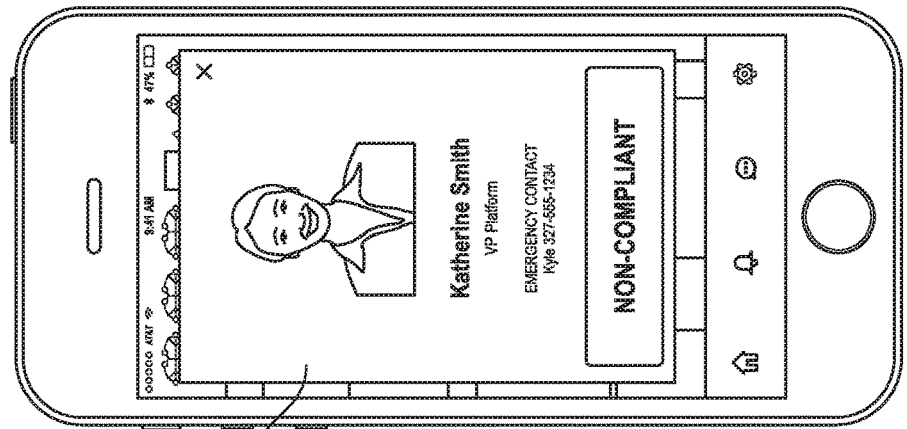
Figure 14B:
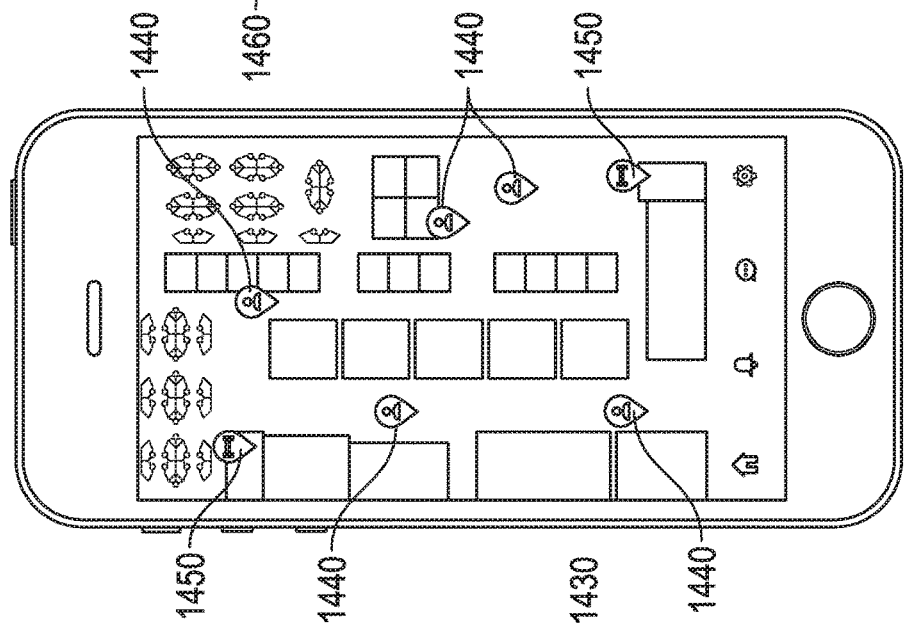
Figure 14A:
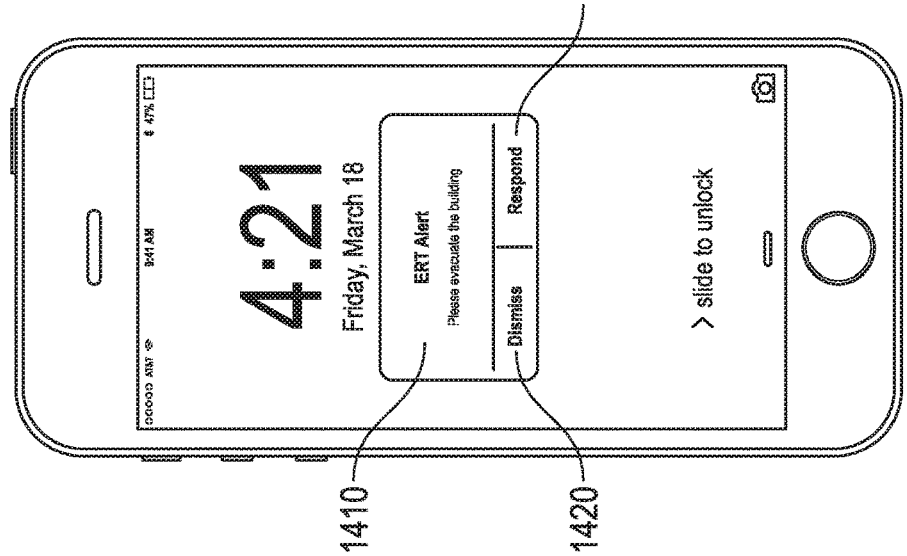

FIGS. 14A through 14C that illustrate different screen shots of a user interface of a user device in accordance with an exemplary implementation of the disclosed embodiments.

Figure 15:
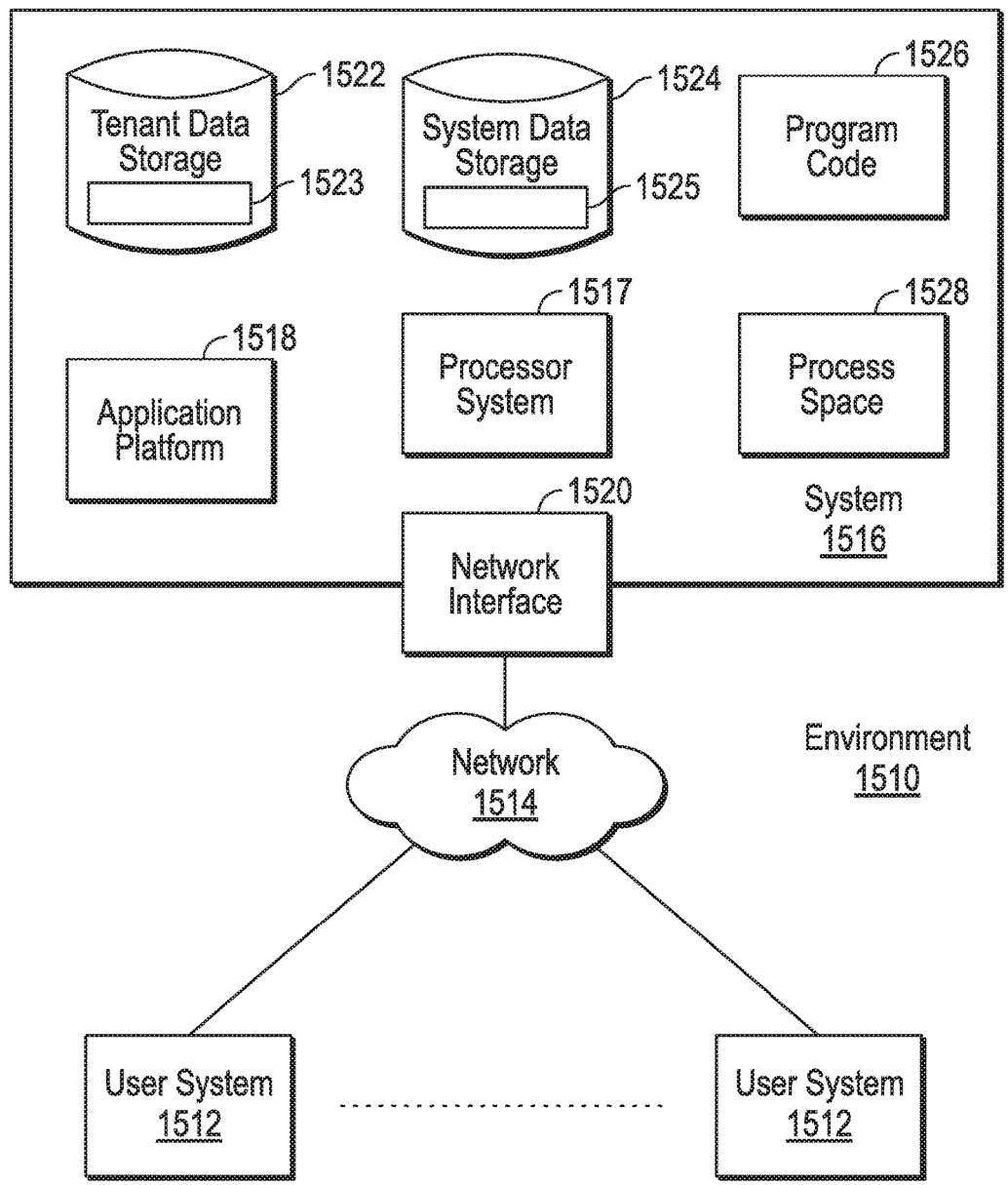

FIG. 15 illustrates a block diagram of an example environment that may be used to implement the embodiments described herein.

Figure 16:
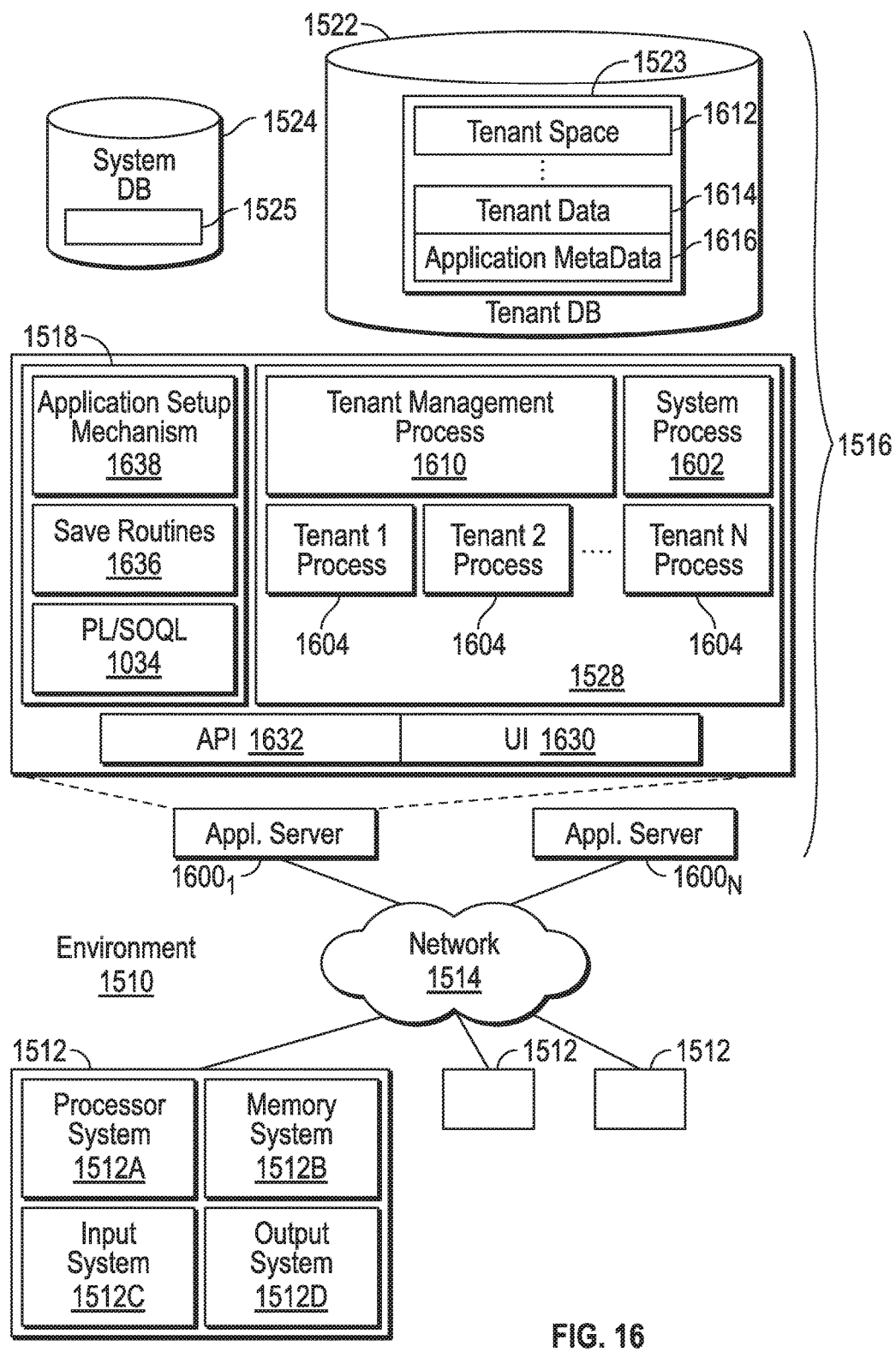

FIG. 16 illustrates a block diagram of another example environment that may be used to implement the embodiments described herein.

DETAILED DESCRIPTION

Systems and methods are provided for coordinating an emergency response at a facility. The system includes employee's user devices, an employee database that stores employee metadata, a module that stores facilities metadata, and a server system that hosts an application that interfaces with the user devices and monitors their locations within a facility. When a trigger event occurs, the application can determine the location of at least a first user device and identification information for an employee who is associated with the first user device based on employee metadata. Based on facilities metadata, the application can generate a floorplan that includes an icon that represents the location of the first user device within the facility. Some of the employees are members of an Emergency Response Team (ERT). The ERT members are a selected group of employees who have been designated as first responders. The floorplan can be displayed at the ERT member's user devices along within other information that helps ERT members coordinate the emergency response In one embodiment, an emergency response application (or app) is provided that can be used by employees with wireless communication devices (e.g., smartphones) to help coordinate their response efforts when an emergency occurs at a facility. When an emergency event or situation arises, the emergency response application facilitates real-time communication between ERT members and employees to help improve employees' situational awareness. The emergency response application can simultaneously activate ERT members and alert employees to the type of emergency in progress. The emergency response application provides employees and ERT members with real-time actionable information in the event of public safety emergencies. It also allows employees to request assistance in real-time. The emergency response application can provide ERT members with real-time response and collaboration tools to assist them in conducting floor sweeps for building evacuations, and giving first response emergency medical care to injured employees. The emergency response application can also provide employees with information needed to reach safety, and allow them to communicate their location and status with ERT members. The emergency response application can also interface with local 911 emergency services, and provides ERT members with the ability to effectively communicate with local Emergency Medical Services (EMS) personnel.

Among other things, the emergency response application provides ERT members with mapping technologies that allow them to determine employee location and safety status so that ERT members can pinpoint location of each employee and determine if he/she is safe. The emergency response application also interfaces with proprietary corporate employee management services for identification of distressed employees and to access floorplan layouts, and also leverages existing smart-phone technologies, such as Bluetooth technologies (e.g., Bluetooth Low Energy (BLE)), iBeacon positioning and GPS geofencing technologies to locate each employee within a building and determine if they are in a safe zone. For example, the emergency response application can interface with proprietary corporate employee management services to access employee metadata required to identify each employee, and use smart-phone technologies to locate each person within the context of a building's floor plan. The emergency response application can provide employees with directions to the nearest emergency exits, building safe-zones and if required, can allow them to request assistance from an ERT member, or call 911. Upon entering a safe zone, the emergency response application allows employees to easily and quickly report their compliance with the order to exit the facility.

Figure 1:
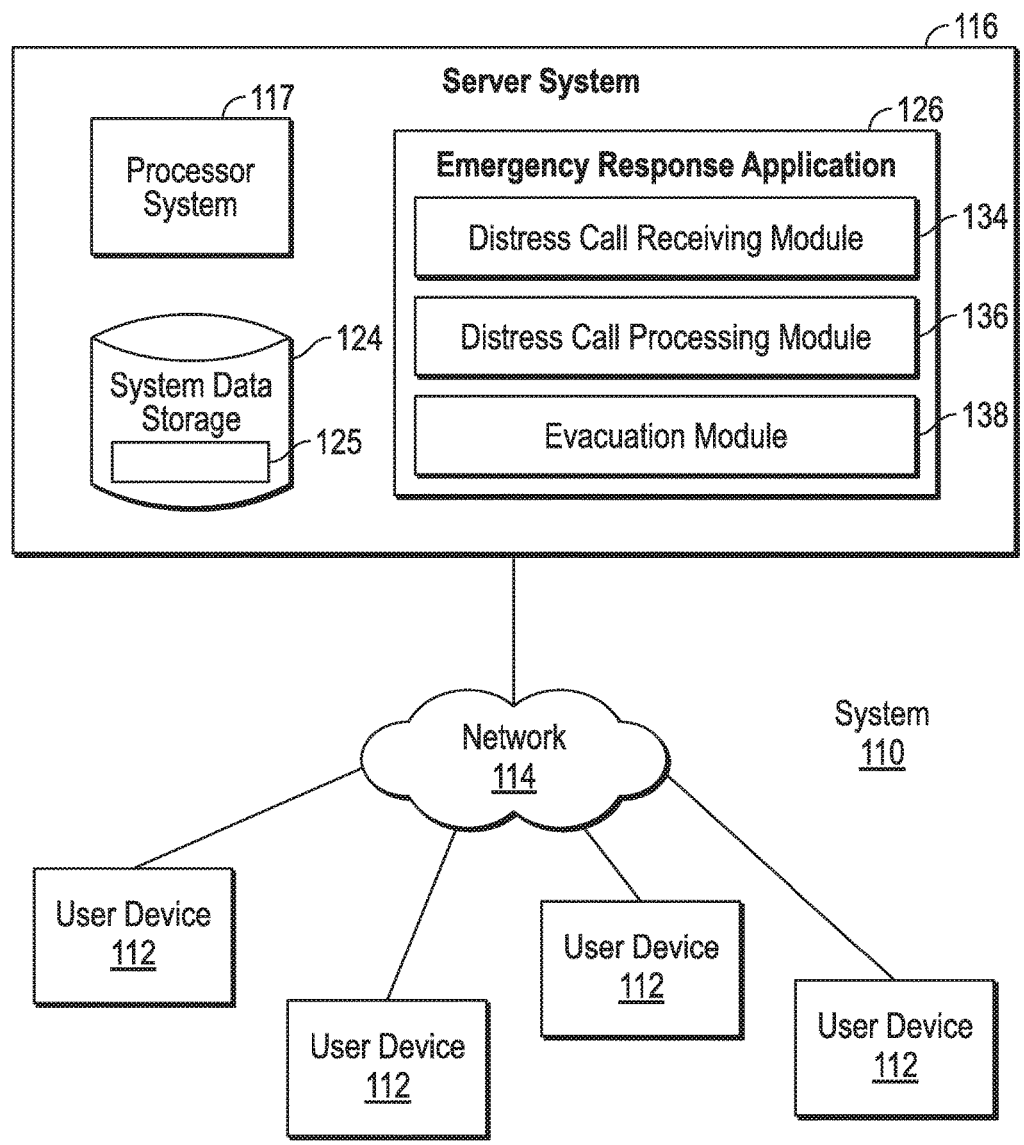
FIG. 1 illustrates a block diagram of an example system in which the disclosed embodiments may be implemented.

FIG. 1 illustrates a block diagram of an example system 110 in which the disclosed embodiments may be implemented. FIG. 1 and the following discussion are intended to provide a brief, general description of one non-limiting example of an example environment in which the embodiments described herein may be implemented. Those skilled in the art will appreciate that the embodiments described herein may be practiced with other computing environments.

System 110 may include user devices 112, a network 114, a server system system 116, a processor system 117, an emergency response application 126, and system data storage 124 for storing system data 125. In other embodiments, system 110 may not have all of the components listed and/or may have other elements instead of, or in addition to, those listed above such as laptop computers, desktop personal computers, workstations, etc. For ease of illustration, FIG. 1 shows one block for each of the processor system 117 and system data storage 124. These blocks 117, 124 may represent multiple processor systems and system data storage units, respectively.

The user devices 112 are communicatively coupled to the server system 116 over the network 114. Each user device 112 is portable or mobile meaning that they can be stationary or moving at any particular time. Without limitation, a user device 112 may be any communications device such as a smartphone or other cellular phone, desktop, laptop or palmtop computer, tablet computer, a personal digital assistant (PDA), any wireless access protocol (WAP) enabled device, or any other Bluetooth enabled device. In this regard, it is noted that as used herein, a smartphone refers to a mobile telephone built on a mobile operating system with more advanced computing capability and connectivity than a feature phone. In addition to digital voice service, a modern smartphone has the capability of running applications and connecting to the Internet, and can provide a user with access to a variety of additional applications and services such as text messaging, e-mail, Web browsing, still and video cameras, MP3 player and video playback, etc. Many smartphones can typically include built in applications that can provide web browser functionality that can be used display standard web pages as well as mobile-optimized sites, e-mail functionality, voice recognition, clocks/watches/timers, calculator functionality, PDA functionality including calendar functionality and a contact database, portable media player functionality, low-end compact digital camera functionality, pocket video camera functionality, navigation functionality (cellular or GPS), etc. In addition to their built-in functions, smartphones are capable of running an ever growing list of free and paid applications that are too extensive to list comprehensively.

In one embodiment, the server system 116 can be a cloud-based server system, and in one implementation, can be an on-demand database services system that implements a cloud platform.

The system data storage 124 includes a database for storing metadata including employee and facilities metadata.

The processor system 117 of server system 116 is configured to execute a emergency response application 126 that provides various different functions via a distress call receiving module 134, a distress call processing module 136, and an evacuation module 138. The application 126 and its various modules perform various functions in conjunction with corresponding client-side functionality at user devices 112 as will be described in greater detail below with reference to corresponding client-side functionality provided at the user devices 112.

Figure 2:
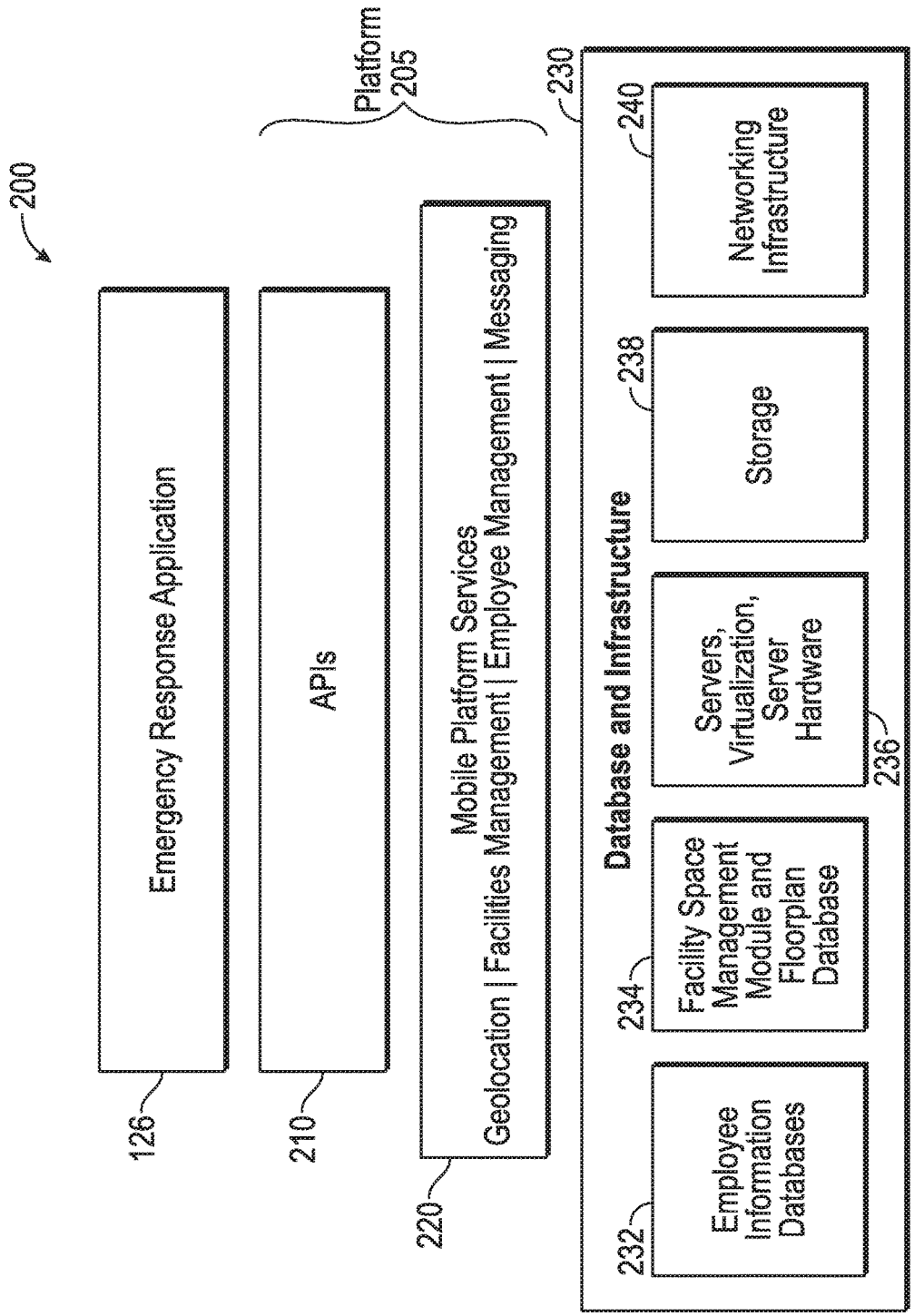
FIG. 2 is a stack diagram that describes how the emergency response application integrates with APIs, platform services, data sources and infrastructure in accordance with an embodiment.

FIG. 2 is a stack diagram that illustrates how the emergency response application 126 integrates with other technologies, services, APIs, and data sources in accordance with an embodiment. The stack 200 include the emergency response application 126, a platform 205 that include Application Programming Interfaces (APIs) 210 and mobile platform services 220 that the emergency response application 126 works in conjunction with, and database and infrastructure 230 that the emergency response application 126 utilizes to perform various functions that will be described below.

The APIs can include, for example, a geolocation API, an employee management API and messaging APIs. The geolocation API allows an employee to provide their location to the emergency response application 126 if they so desire. For privacy reasons, the employee is asked for permission to report location information. For example, the geolocation API returns a location and accuracy radius based on information about cell towers and/or WiFi nodes that a mobile client can detect. The employee management API allows an employee to provide the emergency response application 126 with access to employee information if they so desire. In some embodiments, for privacy reasons, the employee is asked for permission to use their employee information.

The mobile platform services 220 can include geolocation services, facilities management services, employee management services, and messaging services. An example of a facilities management service can be, for example, cloud-based space planning software application provided by Serraview, Inc. An example of an employee management service can be, for example, human capital management applications provided by Workday, Inc. The database and infrastructure 230 can include an employee information database 232, a facility space management module and floorplan database 234 that stores data for facilities of an organization that is utilized by the facilities management service, servers, virtualization and server hardware 236, storage 238 that can store other data (e.g., data relating to events that take place during an emergency response or evacuation), and networking infrastructure 240.

The emergency response application 126 uses geolocation services to identify the real-world geographic location of a user device (i.e., a set of geographic coordinates). For example, the geolocation services can provide GPS coordinates when a GPS signal is available, or in cases where it is not, can use information from cell towers to triangulate the approximate position. In some embodiments, geolocation services can determine location of a user device using positioning systems (e.g., RFID, Bluetooth including BLE or iBeacon, WiFi positioning systems) that process data associated with beacons (e.g., RFID, Bluetooth including BLE beacons or iBeacons, WiFi beacons) that are communicated from devices at known locations throughout the facility. In some embodiments, geolocation services can determine location of a user device using other information associated with a particular employee such as desk location, and in facilities where employees must scan a badge to enter any floor in a facility, geolocation services can determine location of a user device using last badge-in information to help determine which floor a particular user device is located on.

As will be described below, in the disclosed embodiments, the emergency response application 126 can use the geographic coordinates of the user device in conjunction with the floorplans provided by the facility space management module and floorplan database 234 to determine a meaningful location on a particular floor of a facility with reference to how space on that floor is allocated and laid out (e.g., where desks, cubicles, conference rooms, bathrooms, kitchens, entrances, exits, etc. are located on a particular floor). In addition, as will also be explained below, the emergency response application 126 can use the employee management services, that operate in conjunction with the employee information database 232, to access employee information about the employee who is associated with the user device. This employee information can be stored in employee information database 232 as employee metadata. The employee information can include, but is not limited to, human resource management information such as regular work location, current work location, work schedule, title, contact information, etc.

The emergency response application 126 uses the messaging services to communicate with employees, and for communications between ERT members. For instance, the emergency response application 126 uses messaging services to allow ERT members to communicate with each other. The emergency response application 126 uses messaging services to send push notifications to employees (e.g., evacuations orders or other information to an employee who is in distress, etc.). For example, messaging services can be used to create and send push messages to user devices of employees who have the emergency response application 126 and are located within boundaries of a geo-fenced region that corresponds to the facility.

Figure 3:
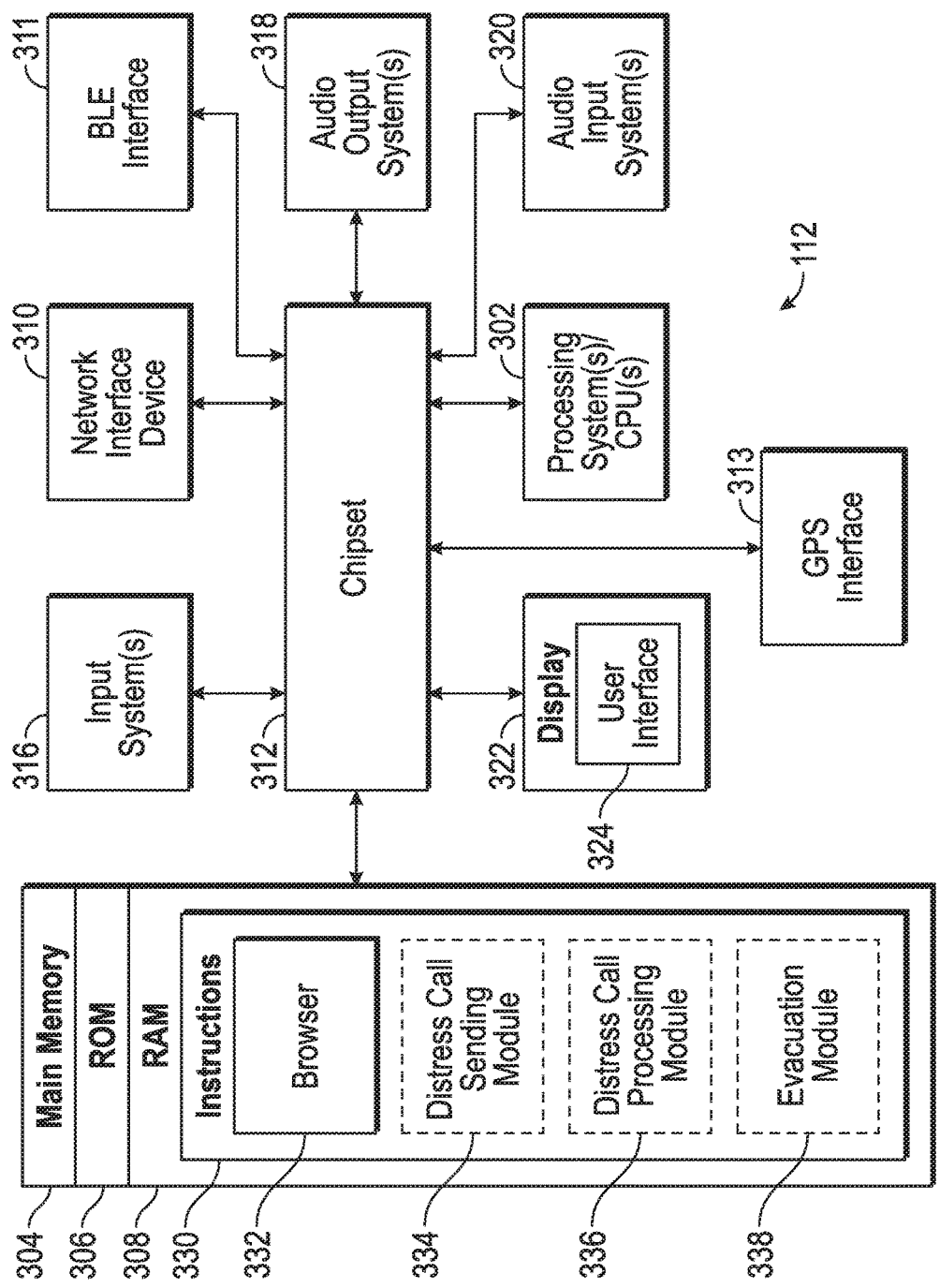
FIG. 3 is a schematic block diagram of a user device in accordance with an embodiment.

FIG. 3 is a schematic block diagram of a user device in accordance with an embodiment. FIG. 3 will be described with reference to FIG. 1. The user device 112 can include one or more processing system(s) 302, main memory 304, a network interface device (NID) 310, a chipset 312, a Bluetooth Low Energy (BLE) Interface 311, Global Positioning System (GPS) interface 313, input systems 316, and audio output systems 318, audio input systems 320, and a display 322 with a user interface 324. It will be appreciated that the user device 112 may not include all of the components shown in FIG. 3, may include other components that are not explicitly shown in FIG. 3, or may utilize an architecture completely different than that shown in FIG. 3.

The chipset 312 is usually located on a motherboard of the user device 112. The chipset 312 is a set of electronic components (e.g., in an integrated circuit) that interconnects and manages the data flow between the processing system(s) 302 and other elements of the user device 112 and any peripherals that are connected to the user device 112. For instance, the chipset 312 provides an interface between the processing system(s) 302 and the main memory 304, and also includes functionality for providing network connectivity through the NID 310, such as a gigabit Ethernet adapter. The chipset 312 typically contains the processor bus interface (also known as a front-side bus), memory controllers, bus controllers, I/O controllers, etc.

Processing system(s) 302 represents one or more general-purpose processing devices such as a microprocessor, central processing unit, or the like. More particularly, the processing system(s) 302 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing system(s) 302 may also be one or more special-purpose processing devices such as an application specific integrated circuit (ASIC), a field programmable gate array (FPGA), a digital signal processor (DSP), network processor, or the like.

The processing system(s) 302 can include one or more central processing units ("CPUs") that operate in conjunction with the chipset 312. The processing system(s) 302 perform arithmetic and logical operations necessary for the operation of the user device 112. The processing system(s) 302 can perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The NID 310 can connect the user device 112 to other computers over the network 114. The network 114 can be an Ethernet or Gigabyte Ethernet LAN, a fiber ring, a fiber star, wireless, optical, satellite, a WAN, a MAN, or any other network technology, topology, protocol, or combination thereof.

Each user device 112 is Bluetooth-enabled meaning that it includes a Bluetooth module and Bluetooth antenna, and can implement all known Bluetooth standards and protocols including a Bluetooth Low Energy (BLE) protocol. Bluetooth technical specifications are developed and published by the Bluetooth Special Interest Group (SIG). Bluetooth Core Specification Version 4.2, adopted Dec. 2, 2014, Core Specification Supplement (CSS) v1 adopted Dec. 27, 2011, Core Specification Addendum (CSA) 2 adopted Dec. 27, 2011, Core Specification Supplement (CSS) v2 adopted Jul. 24, 2012, Core Specification Addendum (CSA) 3 adopted Jul. 24, 2012, Core Specification Addendum (CSA) 4 adopted Feb. 12, 2013, Core Specification Addendum (CSA) 5 adopted Dec. 15, 2015, describe various features of the BLE standards, and are incorporated by reference herein in their entirety. Copies of any of the incorporated Core Specifications, including the Bluetooth Specification Version 4.0, can be obtained from the Bluetooth Special Interest Group (SIG) by contacting them in writing at Bluetooth Special Interest Group, 5209 Lake Washington Blvd NE, Suite 350, Kirkland, Wash. 98033, USA, or by visting their website and downloading a copy. Bluetooth Core Specification Version 4.2 includes Classic Bluetooth, Bluetooth High Speed (HS) protocols and Bluetooth Low Energy (BLE).

Each user device 112 includes Bluetooth module (not illustrated) that includes both a classical Bluetooth interface and a BLE interface 311. The terms "BLE interface," "BLE chipset," "BLE module" can be used interchangeably herein. In general, a Bluetooth module includes a Bluetooth controller and a host (not illustrated in FIG. 3) as defined in the any of the Bluetooth communication standards that are incorporated by reference herein.

The BLE interface 311 generates signals to be transmitted via the Bluetooth antenna, and also receives signals transmitted from other Bluetooth-enabled devices via the Bluetooth antenna. The BLE interface 311 implements a BLE protocol stack that is optimized for occasional connections that allow for longer sleep times between connections, small data transfers, very low duty cycles and simpler topology than Classic Bluetooth devices. When the BLE interface 311 is in the idle state, the BLE interface 311 scans for incoming BLE beacons or advertisement messages from another Bluetooth-enabled device. By contrast, when the BLE interface 311 is in the active state, the BLE interface 311 is communicating with (or connected to) another Bluetooth-enabled device and measures proximity to that Bluetooth-enabled device.

In addition, each BLE interface 311 includes a signal processing module that can be used in conjunction with a proximity detection/determination module that processes information from signals received by the Bluetooth antenna to determine signal strength information, and in some implementations, to determine the approximate distance between the source of those signals that particular Bluetooth module. In one embodiment, the signal processing module can determine/measure signal strength information (e.g., a received signal strength indicator (RSSI)) associated with signals communicated from another Bluetooth module. In one implementation, the signal processing module can generate a reporting message that includes the signal strength information, and provide it to a proximity determination module that can compare the signal strength information to one or more thresholds to determine the proximity to the other Bluetooth module. RSSI is just one exemplary metric that can be used to determine proximity. Alternatively, any other link quality indicators, such as a Bluetooth proximity profile, can be used to determine the distance between two Bluetooth-enabled devices. The proximity profile is defined in the BLE standard. The proximity profile uses a number of metrics including signal strength information, state of the battery charge, whether a device is connected, etc. to characterize the proximity of one BLE enabled device to another BLE enabled device.

The GPS interface 313 is a device for establishing a global position of the user device 112. The GPS interface 313 includes a processor and one or more GPS receivers that receive GPS radio signals via an antenna (not illustrated). These GPS receivers receive differential correction signals from one or more base stations either directly or via a geocentric stationary or LEO satellite, an earth-based station (e.g., cellular base station) or other means. This communication may include such information as the precise location of a user device 112, the latest received signals from the GPS satellites in view, and other information.

Input system(s) 316 (or input device(s)) allow the user to input information to the user device and can include things such as a keyboard, a mouse or other cursor pointing device, a pen, a webcam device, etc. Audio output system(s) 318 (or output device(s)) present information to the user of the user device and can include things such as speakers, or the like. Audio input system(s) 320 (or input device(s)) can include a voice input device and can include things such as microphones and associated electronics that are used by the user of the user device to input audio information. The display 322 and it's user interface 324 provide a touch screen that functions as both a touch input device and a visual output system. All of these systems/devices are well known in the art and need not be discussed at length here.

The chipset 312 can provide an interface to various forms of computer-readable storage media including a main memory 304 (e.g., read-only memory (ROM), flash memory, dynamic random access memory (DRAM) such as synchronous DRAM (SDRAM)), and hard disk. The hard disk is a form of non-volatile memory that stores operating system (OS) software that is copied into RAM and executed by the processing system(s) 302 to control the operation of the user device 112, manage computer hardware and software resources, and provide common services for computer programs executed by the processing system(s) 302. The operating system makes the different parts of the user device 112 work together. The processing system(s) 302 can communicate with the various forms for computer-readable storage media via the chipset 312 and appropriate buses.

The main memory 304 may be composed of many different types of memory components. The main memory 304 can include non-volatile memory (such as read-only memory (ROM) 306, flash memory, etc.), volatile memory (such as random access memory (RAM) 308), or some combination of the two. The RAM 308 can be any type of suitable random access memory including the various types of dynamic random access memory (DRAM) such as SDRAM, the various types of static RAM (SRAM). The main memory 304 (as well as the processing system(s) 302) may be distributed throughout the user device 112.

The ROM 306 of the main memory 304 can be used to store firmware that includes program code containing the basic routines that help to start up the user device 112 and to transfer information between elements within the user device 112. The ROM of the main memory 304 may also store other software components necessary for the operation of the user device 112.

The RAM 308 stores programs/instructions 330 or executable code for one or more programs that can be loaded and executed at processing system(s) 302 to perform various functions. The programs/instructions 330 are computer readable program code that can be stored in RAM 308 (or other a non-transitory computer readable medium of the user device 112) that can be read and executed by processing system(s) 302 to perform various acts, tasks, functions, and steps as described herein. A few non-limiting examples of programs/instructions 330 that are stored in the RAM 308 include a browser application 332 and a distress call sending module 334, a distress call processing module 336, and an evacuation module 338 in accordance with the embodiments described herein. The user device 112 can download the distress call sending module 334, the distress call processing module 336, and the evacuation module 338 as part of an application from a server (or online "store") and load it into RAM 308.

As is known in the art, the browser application 332 includes various functional modules including a user interface that includes a main window and various parts of the browser display such as the address bar, back/forward button, bookmarking menu etc., a browser engine which server as an interface for querying and manipulating one or more instances of rendering engine that is responsible for displaying the requested contents on a browser screen, a networking module used for network calls, a JavaScript Interpreter that is used to parse and execute the JavaScript code, user interface backend, a data storage or persistence layer that is used to save data, including cookies, on the hard disk, etc. When executed by the processing system(s) 302, the browser application 332 can be used for retrieving, presenting, and traversing information resources on the Internet. The browser application 332 brings information resources to the user ("retrieval" or "fetching"), allowing them to view the information ("display", "rendering"), and then access other information ("navigation", "following links"). An information resource is identified by a Uniform Resource Identifier (URI/URL) and may be a web page, image, video or other piece of content. Hyperlinks present in resources enable users easily to navigate to related resources.

The distress call sending module 334 corresponds to and interacts with the distress call receiving module 134 of the server system 116. When executed by the processing system 302, the distress call sending module 334 can perform various functions as will be described below with reference to FIGS. 5 and 6A-6D. When an employee wants to send a distress call to request help from the ERT, the employee launches the emergency response application at their user device and interacts with the user interface to send a request for help to the distress call receiving module 134 that is hosted at the server system, which can then send an alert message to user devices associated with ERT members. The employee can cancel this request at any time if desired. In one embodiment, the distress call sending module 334 can generate and send out push notifications to the user devices 112 of ERT members regarding a request for help from an employee. In one embodiment, the distress call sending module 334 can broadcast these push notifications to the user devices 112 that are associated with ERT members so that all ERT members are aware of that employee's request for help. In another embodiment, the distress call sending module 334 can send targeted push notifications to selected ones of the user devices 112 so that only those ERT members within a certain proximity are made aware of the employee's request for help. This way not every ERT member in the organization will receive every push notification, but only those that are in proximity.

The distress call processing module 336 corresponds to and interacts with the distress call processing module 136 of the server system 116. When executed by the processing system 302, the distress call processing module 336 can perform various functions that will be described below with reference to FIGS. 7, 8A-8C and 9-12. The distress call processing module 336 displays an alert message at the user interface of each ERT member's user device that indicates that a particular employee is requesting help or assistance from the ERT. The distress call processing module 336 can also display messages that give each ERT member an option to confirm whether that member wants to respond to the employee's request for help, or dismiss the alert message.

The distress call processing module 336 provides the employees and ERT members with detailed floorplans that show locations of each employee and ERT member who is at a particular location (e.g., on a particular floor). For instance, the distress call processing module 336 can also display a floorplan via the user interface that includes various icons that represent the locations of employee(s) including ERT members on a particular floor of the facility. In one embodiment, the distress call processing module 336 can also display identifiers for each employee on the screen that includes the floorplan, either automatically or in response to user interaction with icons that appear on the floorplan UI. The distress call processing module 336 can continuously update the position of these icons on the floorplan that is displayed on the UI so that the locations of user devices of the employee(s) and ERT members within the floorplan are up to date.

The distress call processing module 336 can also provide various UI features that help coordinate the response of the ERT members who are responding to a call. The distress call processing module 336 allows ERT members to communicate their willingness to respond to an employee's request for help and can provide functionality that allows ERT members to be assigned specific roles in responding to the request for help. For example, the distress call processing module 336 can provide a role assignment screen that includes prompts that allow each ERT responder-member to select their role in responding to the request for help, and then based on the responses, can publish the role of each ERT responder-member as an entry in a notifications feed page so that ERT members know what their respective roles are in responding to the employee's request for help. This helps coordinate response efforts among the ERT responder-members so that each ERT responder-member knows their role and associated tasks in the response effort.

The distress call processing module 336 can also can also provide other information in the notifications feed page including messages that provide notifications regarding status of the employee or the ERT responder-members, and/or any activity information about or concerning ERT responder-members who are involved in responding to this request for help. This allows the employee and/or ERT members to communicate feedback messages (e.g., comments, questions, answers) on a notification feed page or group chat feed page as part of an interactive chat session that it is accessible by any other ERT members who are responding to the help request. This allows the users to interactively communicate in real-time and exchange messages via a common forum.

The evacuation module 338 corresponds to and interacts with the evacuation module 138 of the server system 116. Upon execution of the evacuation module 338, the processing system 302 executes instructions to perform various functions that will be described below with reference to FIGS. 13 and 14A-14C. The evacuation module 338 of the user device 112, and the evacuation module 138 of the server system 116 provide a system for ensuring that the employee has evacuated the facility when an evacuation order is issued. For example, when an indictor (e.g., message, command or instruction) is received that indicates that employees have been ordered to evacuate the facility, the evacuation module 138 of the server system 116 generates an alert message that is sent or pushed to user devices of all of the employees that are located in the facility that indicates to the employees that they are to evacuate the facility. The evacuation module 338 can present an alert message that gives each ERT member an option to dismiss a request to help evacuate the facility, or confirm that member wants to respond and help with evacuation of the facility. To assist ERT responder-members in determining which employees are still located in the facility, the evacuation module 338 can present a floorplan via a UI of the user devices 112 that identifies locations of any employees that remain in the facility (e.g., on a particular floor that the ERT responder-member is helping evacuate or is in proximity to or located on). The evacuation module 338 continuously updates the positions of the icons within the floorplan so that as the evacuation takes place, positions of the icons that represent the locations of the user devices 112 of the employees who are still present in the facility will be updated. This way, the ERT responder-members can quickly and easily determine who remains inside the facility on that floor. As employees leave a floor that a particular ERT responder-member is responsible for helping evacuate, the floorplan will be updated so that the ERT responder-member can determine which employees and still need to be evacuated. This way the ERT responder-member can find specific employees who still need to be evacuated, and can leave the facility once he/she knows all employees have been evacuated. The evacuation module 338 also allows ERT members to input information that indicates identity and location of any employee(s) who has/have not complied with the evacuation order, automatically generate a message that identifies the particular employee who has not evacuated in compliance with the evacuation order and the current location of that non-compliant employee within the facility, and then send this message to other such as a head of the ERT, ERT responder-members, all ERT members, the employee's manager, emergency responders (e.g., police, firemen, etc.) who are (or will be) assisting with the evacuation of the facility, etc. For instance, in one embodiment, any ERT member can select via a user interface of their user device an icon or button displayed within the floorplan that represents and identifies any employee who has not complied with the evacuation order.

Prior to describing further details of distress call sending, receiving and processing with reference to FIGS. 5-12 and evacuation with reference to FIGS. 13 and 14A-14C, a general description of the emergency response application and various technologies used to implement various features of the emergency response application will now be described below in greater detail with reference to FIGS. 4A-4D.

Figure 4A:
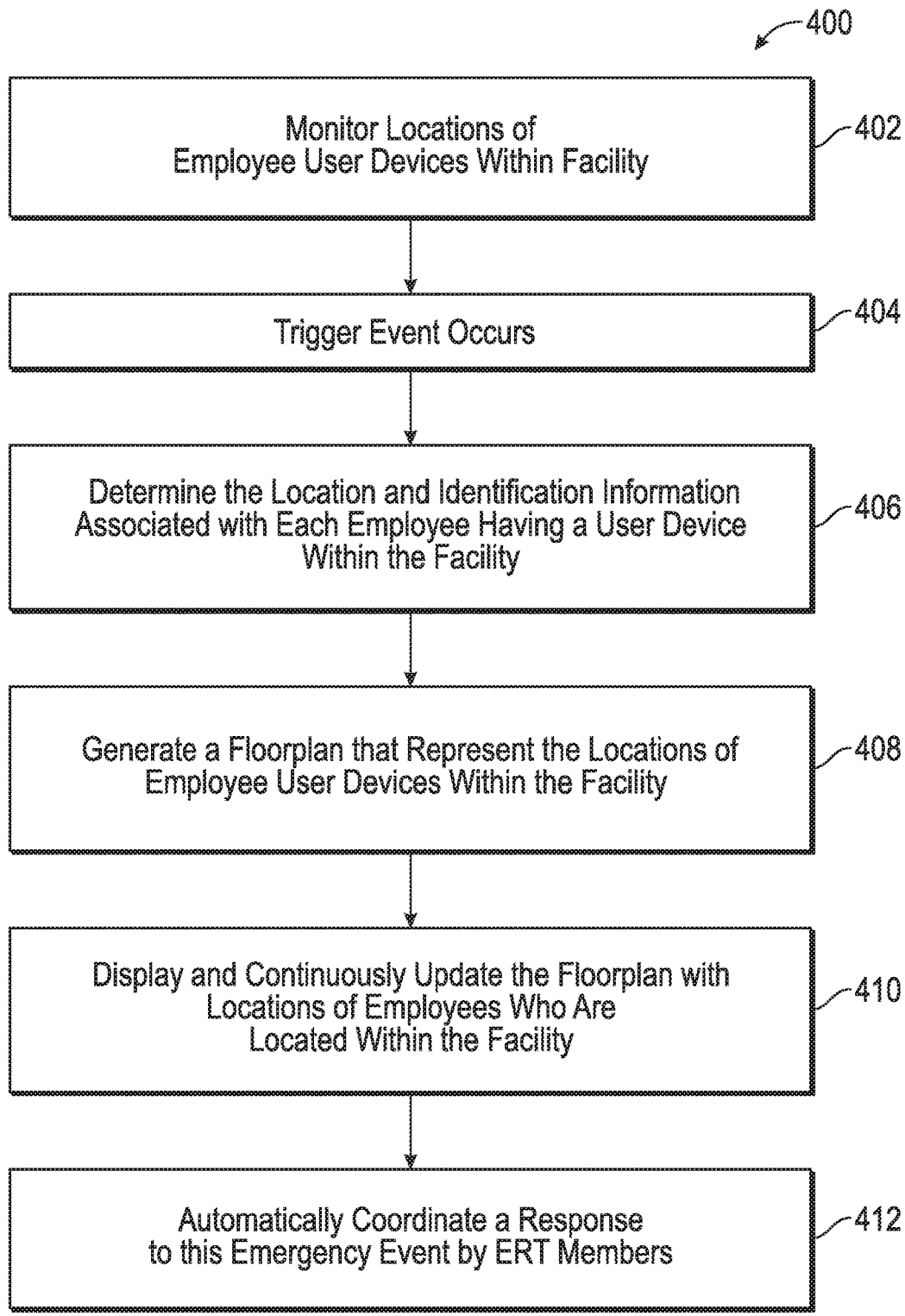
FIG. 4A is a flow diagram of an exemplary method performed by an emergency response application in accordance with an embodiment.
Figure 4B:
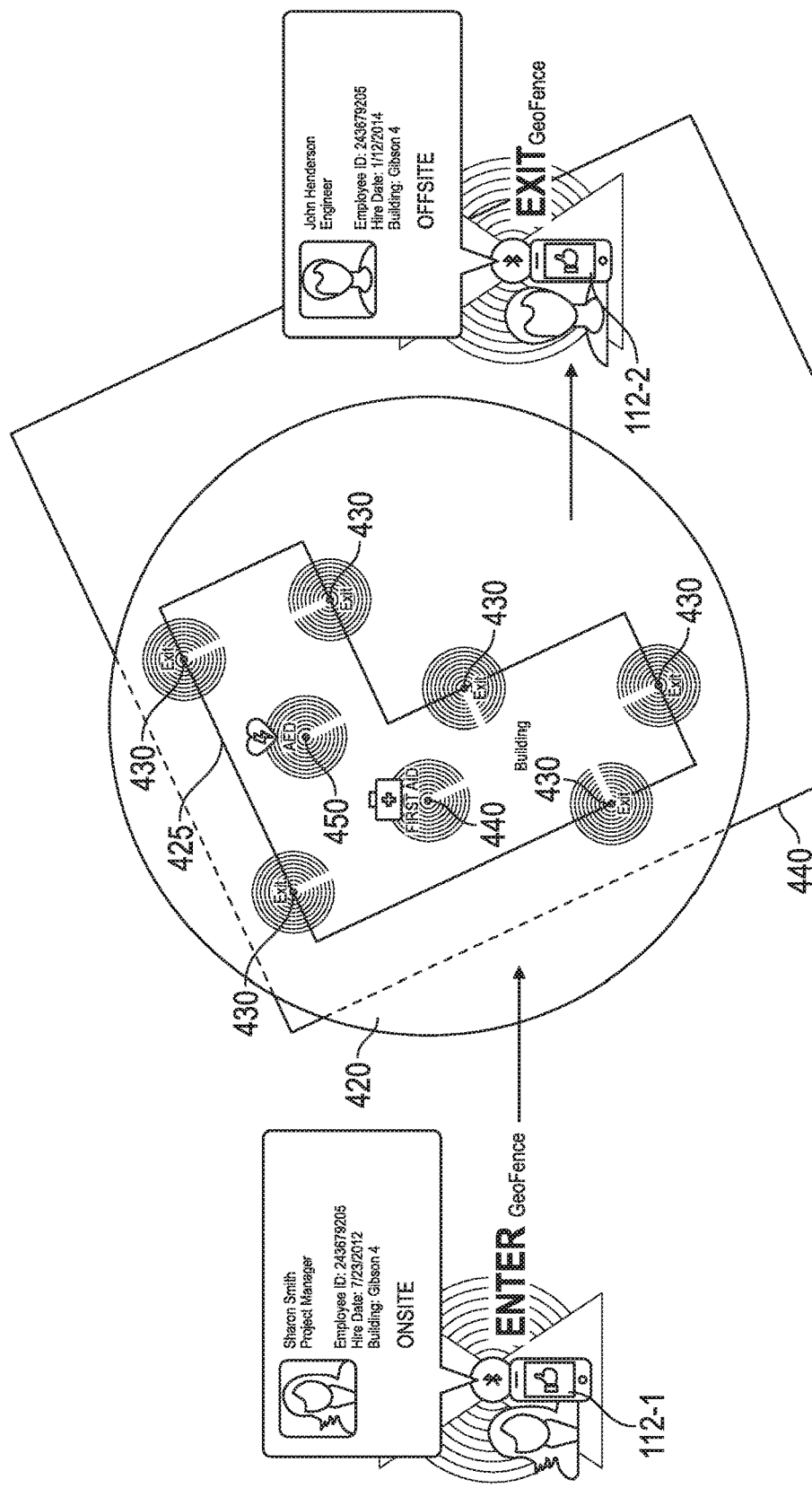
FIGS. 4B through 4D illustrate various elements of a system used in conjunction with the emergency response application to determine the locations of employees in accordance with an embodiment.
Figure 4C:
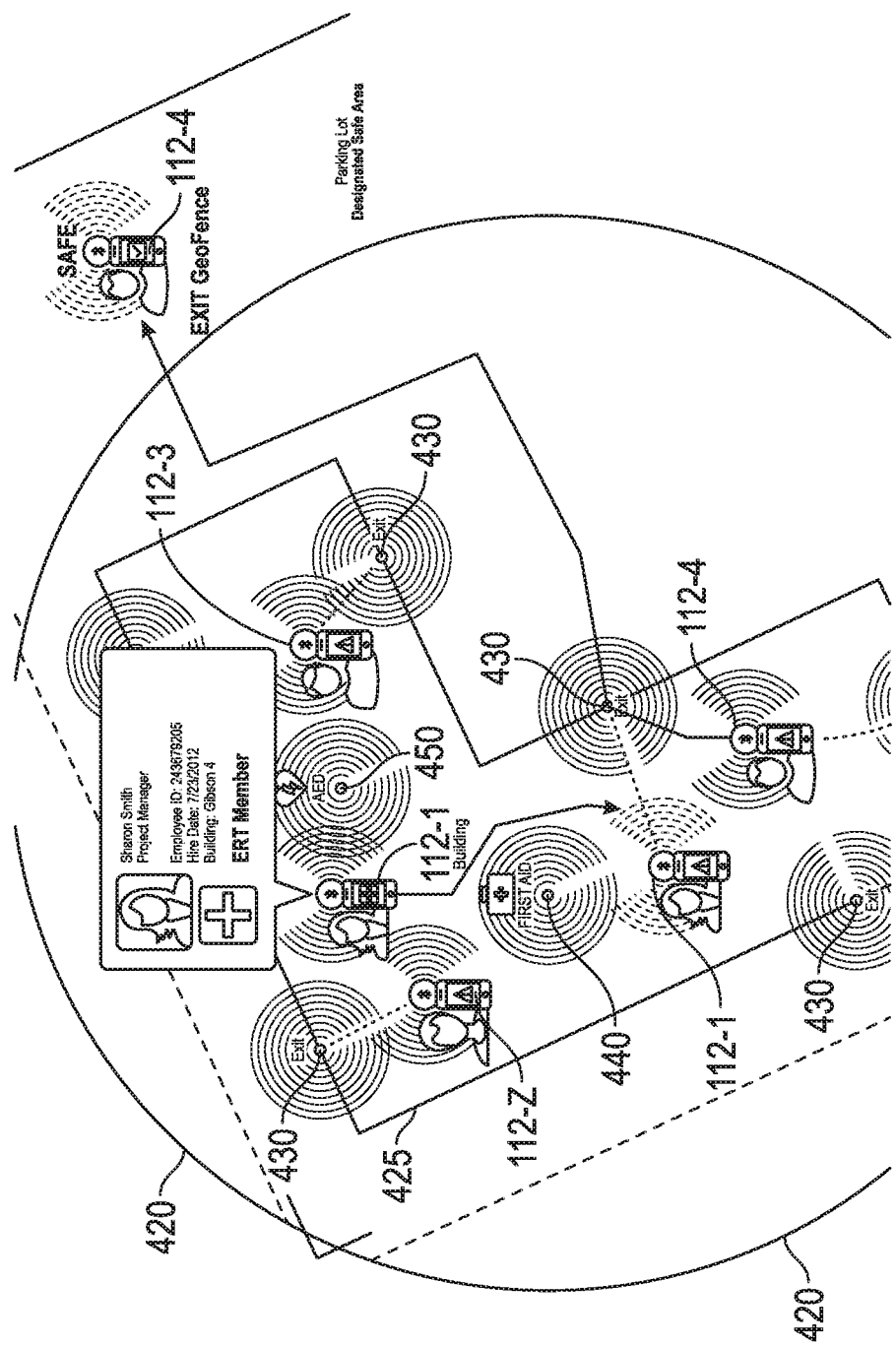
Figure 4D:
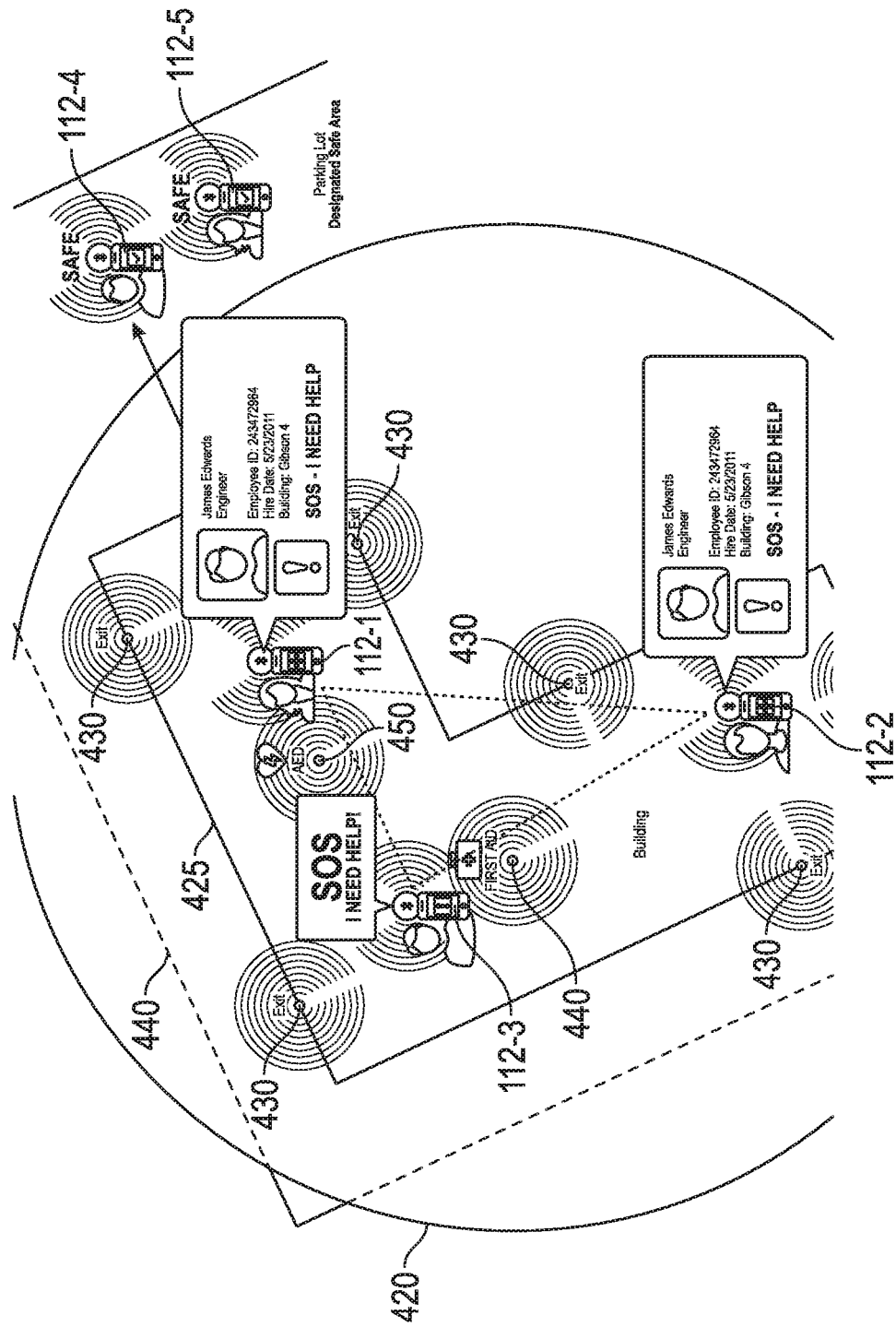

FIG. 4A is a flow diagram of an exemplary method 400 performed by an emergency response application in accordance with an embodiment. The method 400 will be described with reference to FIGS. 1 through 3 and FIGS. 4B through 4D, which illustrate various elements of a system used in conjunction with the emergency response application to determine the locations of employees. In one embodiment, the emergency response application utilizes Bluetooth low energy (BLE) technology that is available in most consumer smartphones, along with a beacon positioning (e.g., iBeacons) and GPS geo-fencing to create a dynamic local area network that utilizes each employee's phone. For example, as illustrated in FIGS. 4B-4D, beacon positioning devices 430, such as iBeacons, can be placed strategically throughout the facility 425, for example, near exits, or where emergency equipment or first aid equipment is located so that employees can use the emergency response application to quickly and easily find key locations that become important during an emergency situation. The terms iBeacon and beacon are used interchangeably herein. As is known in the art, iBeacon is the name for a technology standard by Apple®, which allows mobile applications (running on both iOS and Android devices) to listen for signals from beacons in the physical world and react accordingly. In essence, iBeacon technology allows mobile applications to understand their position on a micro-local scale, but the underlying communication technology is BLE.

Any employee can have a user device 112, such as a smartphone that is configured to run the emergency response application 126. Each user device 112 can interact with a server system to run or execute the emergency response application. An employee can have a variety of different roles within a company or organization, and some employees are also part of an Emergency Response Team (ERT). Each ERT member is a first responder when other employees request help or assistance in an emergency situation. The emergency response application 126 can be used by ERT members to provide decentralized real-time assistance during emergency events.

The method 400 begins at 402, where the emergency response application 126 monitors locations of user devices 112 of employees that are located within a virtual boundary around a perimeter of a facility. Any user devices 112 running the emergency response application can be recognized as being within the virtual boundary around the perimeter the facility or as being outside that virtual boundary. In one embodiment, as illustrated in FIG. 4B, the virtual boundary is defined using geofencing technologies to define a geo-fence region 420 around the perimeter of the facility 425. The emergency response application 126 recognizes whenever an employee enters or exits the geo-fence region 420, and keeps track of which employees remain within the geo-fence region 420. When an emergency event or situation occurs in which it is advisable for employees to exit the facility, members of the emergency response team have an easy way to know who remains inside the facility versus who has left the facility, and also where the located within in the facility (if they remain within the facility).

For instance, in the example shown in FIG. 4B, the user device 112-1 of an employee named Sharon Smith has not yet entered the geo-fence region 420 (e.g., is located outside the geo-fence region 420). Then, as shown in FIG. 4C, after the user device 112-1 of Sharon Smith has entered the geo-fence region 420 (e.g., is located inside the geo-fence region 420), the emergency response application 126 can determine that she is present in the facility 425, and can display an icon that represents the location of her user device 112-1 within the facility 425. Likewise, in FIG. 4B, when the user device 112-2 of an employee named John Henderson has left the geo-fence region 420, the emergency response application 126 can determine that his user device 112-2 is no longer present in the facility 425. When the user device 112-2 of John Henderson enters the geo-fence region 420, as shown in FIG. 4C, the emergency response application 126 can determine that he is present in the facility 425, and can display an icon that represents the location of is user device 112-2 within the facility 425.

In response to occurrence of a trigger event at 404, the emergency response application 126 can determine (at 406) a location of user devices 112 within the facility, and determine identification information associated with each employee having a user device 112 within the facility (as define by the virtual boundary). For example, as shown in FIG. 4C, when a trigger event occurs, the emergency response application 126 can determine the location of user devices 112-1 . . . 112-4 that are located within the facility, and can continuously update the location of each user device as they move into, within or outside of the facility (e.g., in FIG. 4C the user device 112-1 of Sharon Smith has moved within the facility 425, whereas the user device 112-4 has moved from within the facility 425 to a parking lot that is outside the facility 425 and outside the geo-fence region 420). This allows ERT members to quickly and easily determine which employees are located within the facility, and where they are located within a particular floor of the facility.

The different types of trigger events can vary. For example, the trigger event could be the issuance of an evacuation order in response to a public safety emergency such as a fire, earthquake, hurricane, terrorist attack, etc. In other cases, the trigger event can occur when an employee makes a call or request for help in an emergency situation (e.g., employee is injured, disabled, trapped in a room, etc.). An example of both scenarios is illustrated in FIG. 4D. In this example, an evacuation order has been issued and an employee associated with a user device 112-3 has requested help (e.g., the employee is trapped, injured, or disabled and can't exit the facility).

In one embodiment, the location of each user device 112 within the facility can be determined based on GPS coordinates of the user device 112 in combination with floor information that indicates which floor of the facility the user device 112 is located on. For example, any time an employee's user device enters the geo-fence region 420, the emergency response application 126 can report the user device's GPS coordinates to a location service that keeps track of where each employee's user device is within the facility. Updates regarding the device's GPS coordinates can be sent to the location service periodically, or in response to an event, etc. Further, in one implementation, the emergency response application 126 can determine the floor information based on information from the first user device 112 that identifies at least one beacon (e.g., iBeacon) that has a known location within the facility 425. This way, the emergency response application can determine the location of the employee's user device in terms of GPS coordinates and a particular floor within the facility. In the event the facility 425 consists of a single floor then GPS coordinates would be enough to determine the employee location without having to use beacons. However, as will be described below, use of beacons is still useful in that it can help employees locate things like exits, emergency equipment and first aid equipment.

In another embodiment, if GPS coordinates are not available, the location of a particular user device can be determined based on signal strength measurements (RSSI) provided from three or more beacons located on a particular floor of the facility that have known fixed coordinates. For example, the approximate distance of a user device from a particular beacon can be determined based on a signal strength measurement of a signal from that beacon. This can be done for each beacon to determine distance from three beacons that are at known locations on a particular floor of the facility. Using this information, the user device can compute, using triangulation processing, the approximate position or location of the user device based on its distance from the three (or more) fixed beacons, and the floor that the user device is located on is known based on the fact that each beacon is known to be located on a particular floor of the facility.

In one embodiment, identification information associated with each employee who is associated with a user device 112 within the facility 425 can be determined using an employee management service that operates in conjunction with an employee information database that includes metadata about each employee such as job title, office location within this facility, work hours, date of birth, emergency contacts, whether the employee suffers from any disability or medical condition, etc. In some embodiments, corporate employee management services can be used to identify any employee within the geo-fence region 420. For example, as illustrated in FIG. 4C, when the user device 112-1 of Sharon Smith enters the geo-fence region 420, an icon can be displayed that represents Sharon Smith's user device 112-1 within a floorplan, and by selecting that icon other information about Sharon Smith can be viewed including identification information, which in this non-limiting example includes her name, title (i.e., a project manager), her employee ID, hire date and home building where she is normally located. Likewise, as shown in FIG. 4C, when the user device 112-2 of John Henderson leaves the geo-fence region 420, an icon can be displayed that represents the location of John Henderson's user device 112-2, and that when selected can display information about John Henderson including identification information, which in this non-limiting example includes his name, title, employee ID, hire date and home building.

At 408, the emergency response application 126 can then generate, by working in conjunction with a facility space management module and floor plan database 234, a floorplan of a particular floor located within the facility 425. At a minimum, the floorplan includes a map of a particular floor of a facility 425 (or a portion thereof), along with icons that represent the location of each user device 112 located on that particular floor. By selecting any icon that represents a particular user device, information about that employee whom that user device belongs to can be displayed (including identification information associated with the employee).

This floorplan can be displayed on user devices 112 of the employees including those who are ERT members. By displaying the floorplan via a user interface, ERT members can locate employees, for example, when help is requested or an emergency situation occurs and evacuation of the facility is ordered.

For example, as shown in FIG. 4C, in a situation where an issue an order is issued to evacuate the facility, a floorplan can be displayed that will illustrate the locations of the nearest exits 430, first aid equipment 440 and other emergency response equipment 450, which are determined based on beacons mounted near those exits 430, first said equipment 440 and other emergency response equipment 450. This way employees can quickly and easily find the closest exit 430 evacuate the building.

As another example shown in FIG. 4D, when an employee (James Edwards) associated with user device 112-3 requests help, ERT members associated with user devices 112-1, 112-2 can receive a notification message that is displayed via the user interface of her/his user device 112-1, 112-2. The notification can indicate that a particular employee (James Edwards) has requested help and show where his user device 112-3 is located within the facility 425, and can also provide identification information as discussed above. This way employees and ERT members, such as Sharon Smith and James Edwards, can quickly and easily locate any equipment 440, 450 needed to aid James Edwards, who is in distress, and if necessary find the closest exit 430 remove him from the building.

At 410, icons that are displayed within the floorplan can be continuously updated. This can include updating the locations or positions of icons within the floorplan that represent employees (including ERT members) who are on a particular floor of a facility 425. For example, as employees move about the floor, the locations or positions of icons that represent employees (including ERT members) can be updated to reflect their current position. This way, if the employee moves from one location to another, the location of that employee will be updated so that the ERT member can find the employee. In addition, when new employees enter that particular floor of the facility new icons with corresponding identification information can be added. For example, as shown in FIG. 4C, in a situation where an issue an order is issued to evacuate the facility, the employees' locations with respect to the floorplan are continuously updated as they move in response to the evacuation order. When the employee associated with user device 112-4 exits the building and moves into the parking lot his location will be updated as shown. Likewise when the employee, Sharon Smith, associated with user device 112-1 moves within the facility 425 her location will be updated as shown, whereas employees associated with the user devices 112-2, 112-3 remain the same because they have not moved. When employees associated with the user devices 112-2, 112-3 remain the same because they have not moved.

At 412, the emergency response application 126 can receive input from the ERT members, and then based on inputs to the emergency response application 126, automatically coordinate a response by the ERT members. Examples of input received from the ERT members that is used to coordinate a response will be described in greater detail below.

Figure 5:
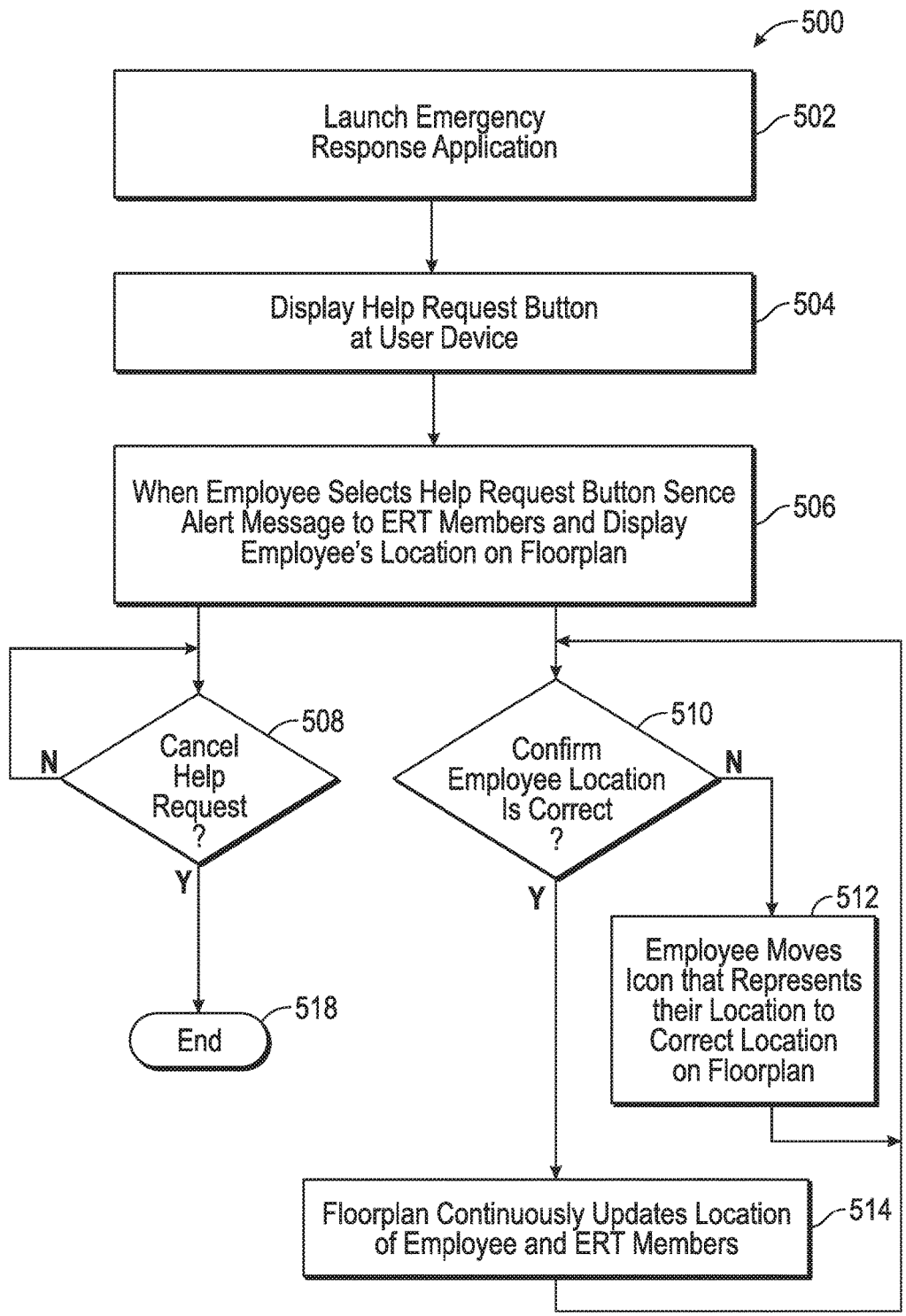
FIG. 5 is a flow diagram of an exemplary method performed by an emergency response application when an employee sends a distress call in accordance with an embodiment.

FIG. 5 is a flow diagram of an exemplary method 500 performed by an emergency response application when an employee sends a distress call in accordance with an embodiment. The method 500 will be described with reference to FIGS. 1 through 3 and FIGS. 6A through 6D that illustrate different screen shots of a user interface of a user device in accordance with an exemplary implementation of the disclosed embodiments. It should be appreciated that the examples in FIGS. 6A-6D are non-limiting and simply illustrate exemplary implementations.

The method 500 begins at 502, where an employee launches the emergency response application at their user device by interacting with icon 610 (FIG. 6A). Here the user interaction can be selecting the icon via a touch movement, a voice command, or any other type of user input that can be used to activate the emergency response application.

The method 500 proceeds to 504, where the emergency response application 126 displays a help request button 620 on the user interface of the user device as shown in FIG. 6B. When the employee interacts with (e.g., selects, pushes or otherwise activates) the help request button 620, the emergency response application (e.g., hosted at the server system) receives or generates an alert message. The server system then pushes the alert message to user devices associated with ERT members who are in proximity to the employee. The alert message indicates that the employee who is associated with a user device 112 has requested help from the ERT. Generation of this alert message and its communication to the server system and other user devices is one example of a trigger event.

At 506, the emergency response application hosted at the server system can also generate and display other information at the user devices associated with ERT members. For example, the emergency response application can also generate and display other information as illustrated in FIG. 6C at the user interface of the user device of the employee. In this example, the emergency response application 126 can generate and display a screen that includes a confirmation button 622 and a cancellation button 624.

As shown at 510 of FIG. 5, the employee can select the confirmation button 622 to confirm that the employee's location as displayed on a floorplan is correct. If the employee's location as displayed on a floorplan is incorrect, the employee can then move (at 512) the location of an icon (e.g., a pin) that represents the employee's location to the correct location on the floorplan to change the location of the icon that represents the employee's position, and then select the confirmation button 622. This way ERT members can more easily locate the employee when responding to the employee's request of help. In one embodiment, following 512 or 514, the method 500 loops to keep checking with the employee to confirm the employee's location is correct until the employee cancels the request for help at 508 by selecting the cancellation button 624 (yes at 518). This way the employee's request will not be inadvertently disregarded in scenarios where employee submit requests at the same time.

At 508, the employee can select the cancellation button 624 at any time to cancel or end his/her request for help (at 518). This feature is helpful in situations where the employee inadvertently sent an alert message, or in cases where the employee has already been helped by an ERT member, or in cases where the emergency situation or event has ceased. For example, when the request for help or rescue is complete the employee can select the cancellation button 624 (FIG. 6C), which causes the emergency response application to end the request for help at 518.

In addition, at 506, the emergency response application can also generate and display a map of a floorplan (also referred to herein as a "floorplan") that is displayed at user devices of ERT members. For example, in one non-limiting embodiment, the floorplan of a particular floor located within the facility can include an icon that represents the location of the employee's user device, icons that represent locations of any exits on that particular floor of the facility, icons that represent locations of any emergency response equipment located on that particular floor of the facility, and icons that represent locations of the user devices of any ERT responder-members who are present on that particular floor of the facility.

Figure 6D:
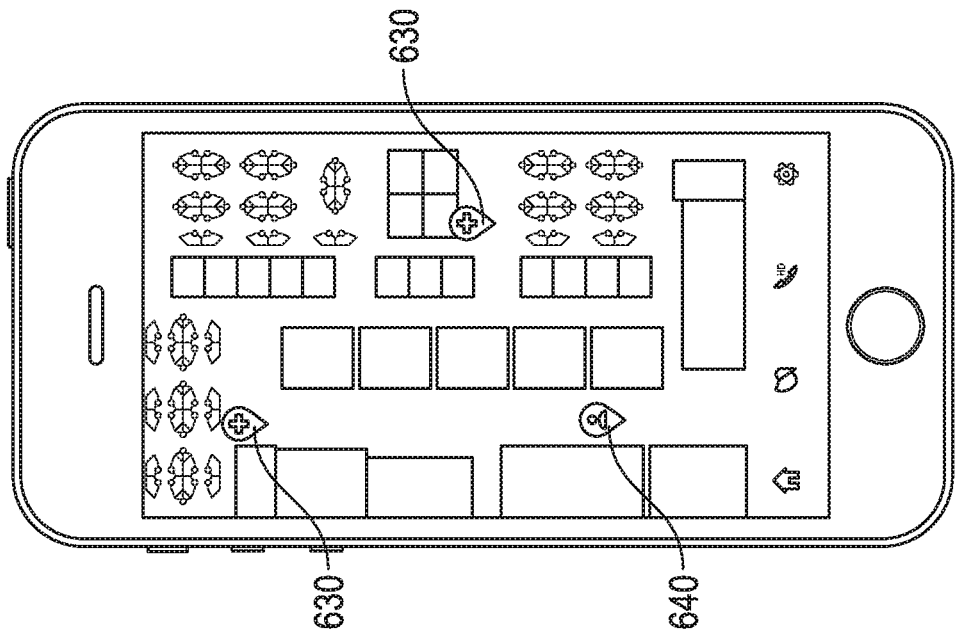
Figure 6C:
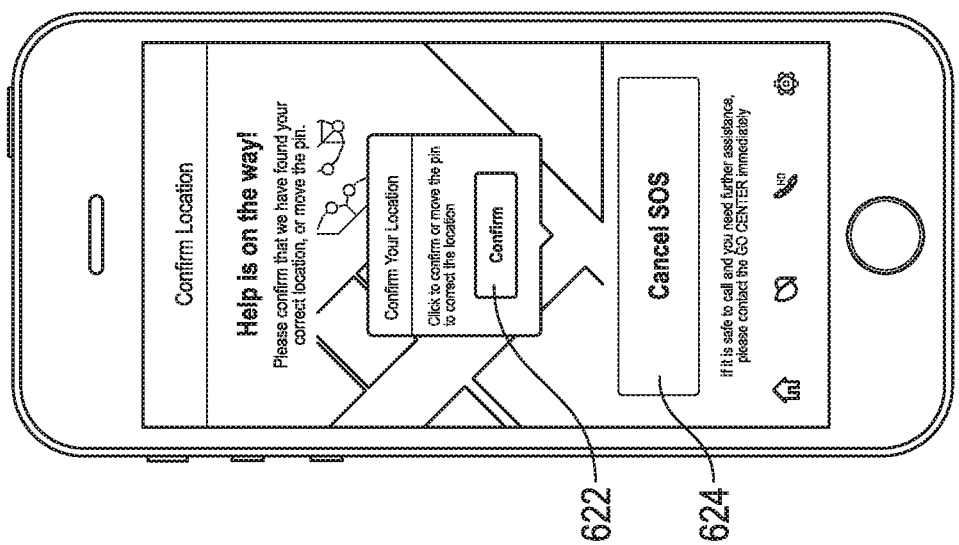

For instance, one implementation of a floorplan that can be displayed at the user interface of a user device of an employee who is sending a request for help is illustrated in FIG. 6D. In this example, the floorplan can include a map of a particular floor of the facility where the employee is located. The floorplan can include the layout of any entries or exits, walls, office partitions, windows, doors, desks, equipment, cubicles, walkways, etc. The emergency response application 126 also adds various icons to the floorplan that can include an icon that represents the location of the employee's user device 112 on that particular floor, and icons that represent locations any ERT responder-member's user devices who are present on that particular floor of the facility. In this particular example, the floorplan also shows three icons 630, 640 that represent the locations of user devices, where ERT member's user devices are represented via icons 630, and where the employee's user device is represented by icon 640. The floorplan can also include icons for a variety of other information, such as, icons that represent locations of any exits on that particular floor of the facility, and other icons that represent locations of any emergency response equipment located on that particular floor of the facility, etc. It should be appreciated that the example in FIG. 6D is non-limiting and simply illustrates one exemplary implementation.

In this embodiment, the floorplan can be displayed on the user interface of the user devices 112 to show the employee and other ERT members the response of ERT responder-members (i.e., ERT members who are responding to the employee's request for help). As the ERT members respond, the emergency response application 126 continuously updates (at 514 of FIG. 5) the positions of the icons within the floorplan that represent locations of the employee's user device and the user devices 112 of any ERT responder-members who are present on that particular floor of the facility.

FIG. 7 is a flow diagram of an exemplary method 700 performed by an emergency response application when members of an ERT receive a distress call in accordance with an embodiment. The method 700 will be described with reference to FIGS. 1 through 3 and FIGS. 8A through 8C that illustrate different screen shots of a user interface of a user device in accordance with an exemplary implementation of the disclosed embodiments. It should be appreciated that the examples in FIGS. 8A-8C are non-limiting and simply illustrate exemplary implementations.

The method 700 begins at 702, when ERT members receive an alert message that is displayed at the user interface of each ERT member's user device, as shown, for example, in FIG. 8A. As described above with reference to FIG. 5, this alert message indicates that a particular employee is requesting help or assistance from the ERT, and can be communicated to ERT members when the employee requests help by interacting with the emergency response application via the user device that is associated with that employee.

In one embodiment, illustrated in FIG. 8A, upon receiving the alert message, the emergency response application 126 can display a screen (via a user interface at each of the ERT member's user devices) that gives each ERT member an option (at 704) to confirm whether that member wants to respond to the employee's request for help. In FIG. 8A, this is illustrated by the options to either dismiss the alert message (via button 820) or respond to the alert message (via button 830). Each member that confirms that he/she wants to respond to the request for help is an ERT responder-member (also referred to herein as a "responder" member). Each member that dismisses the alert message (or confirms that he/she does not want to or cannot respond to the request for help is a "non-responder" member with respect to that request for help). It should be appreciated that the example in FIG. 8A is non-limiting and simply illustrates one exemplary implementation.

At 706, for each ERT responder-member, a floorplan can be displayed on a user interface of their that ERT responder-member's user device as illustrated in FIG. 8B. In one embodiment, the floorplan can include any of the icons described above with reference to FIG. 6D and 506 of FIG. 5. It is desirable if the floorplan includes locations of any exits and any emergency or first aid equipment since that type of information may be important to ERT members who are arriving at the scene if such equipment is needed to aid the employee who requested help. As also noted above, the emergency response application 126 can continuously update the position of the icon that represents the location of the employee's user device 112 within the floorplan, as well as the positions of the icons that represent locations of the ERT member's user devices 112 that are present on that particular floor of the facility. Thus, via the icons that are displayed on the UI of the emergency response application, the employee and ERT members know the location of the employee's user device within the floorplan and locations of the user devices of any ERT responder-members who are responding to the request for help.

At 708, at the user interface of each ERT responder-member's user device 112, a role assignment screen can be displayed as shown, for example, in FIG. 8C. The role assignment screen can include prompts that allow each ERT responder-member to select their role in responding to the request for help. For instance, in the non-limiting example illustrated in FIG. 8C, the role assignment screen, which is labeled check-in, includes a button 860 that allows an ERT responder-member to select the role of incident command, a button 870 that allows an ERT responder-member to select the role of incident scribe, and a button 880 that allows an ERT responder-member to select the role of emergency services coordinator. Although not illustrated options for other roles can be displayed depending on the implementation. Further, in some implementations, selection of button 880 can automatically place a call to emergency services responders such as a police department, fire department, etc., or may simply designate a particular ERT member as being the lead point of contact in coordinating interactions with such emergency service responders. It should be appreciated that the example in FIG. 8C is non-limiting and simply illustrates one exemplary implementation.

Based on the selections by each ERT responder-member at 710, for example via interaction with the role assignment screen (e.g., selecting a button via touch or voice), the emergency response application 126 can assign each ERT responder-member a role in responding to the employee's request for help. At 712, the emergency response application 126 can then publish the role of each ERT responder-member as an entry in a notifications feed page (not illustrated in FIG. 8C) so that ERT members know who the ERT responder-members are and what their respective roles are in responding to the employee's request for help. In addition, as will be described below, the emergency response application 126 can also other information in the notifications feed page including messages that provide notifications regarding status of the employee or the ERT responder-members, and/or any activity information about or concerning ERT responder-members who are involved in responding to this request for help. This helps coordinate response efforts among the ERT responder-members so that each ERT responder-member knows their role and associated tasks in the response effort.

FIG. 9 is a flow diagram of an exemplary method 900 performed by an emergency response application when an ERT member selects a notifications icon in accordance with an embodiment. The method 900 will be described with reference to FIGS. 1 through 3 and FIG. 10 that illustrates a screen shot of a user interface of a user device in accordance with an exemplary implementation of the disclosed embodiments. It should be appreciated that the example in FIG. 10 is non-limiting and simply illustrates one exemplary implementation.

The method 900 begins at 902, when an ERT member selects a notifications icon 1010, which causes the emergency response application 126 to generate a notifications feed page 1020 that can be displayed via a user interface at the ERT member's user device. An ERT member can select the notifications icon 1010 at any time after the emergency response application 126 has been activated or has been launched. In addition, other employees can also select the icon 1010 if they are the employee that submitted a request for help. In one implementation, other non-ERT member employees who did not submit the request for help, but who are in close proximity to the employee who did submit the request for help can also select the notifications icon 110 and view the notifications feed page 1020.

The emergency response application 126 can publish a wide variety of information and notification messages within the notifications feed page 1020 including the role of each ERT responder-member (as described above), and any other types of information and notification messages that might be of interest to the employee or ERT members including ERT responder-members. For example, the emergency response application 126 can publish messages that include information or notifications regarding status of the employee or any of the ERT responder-members, or messages that include any activity information about ERT responder-members and emergency services personnel involved in responding to the employee's request for help. For example, notification status messages can include things such as role check-ins by ERT responder-members, information about employees who were determined to be non-compliant in response to an evacuation order, time of a 911 call and name of caller, ID and location of an employee who made a distress call, etc.

FIG. 11 is a flow diagram of an exemplary method 1100 performed by an emergency response application when an ERT member selects a group chat icon in accordance with an embodiment. The method 1100 will be described with reference to FIGS. 1 through 3 and FIG. 12 that illustrates a screen shot of a user interface of a user device in accordance with an exemplary implementation of the disclosed embodiments. It should be appreciated that the example in FIG. 12 is non-limiting and simply illustrates one exemplary implementation. The method 1100 begins at 1102, when an ERT member selects the group chat icon 1210 (FIG. 12), which causes the emergency response application 126 to generate a group chat page 1220 that can be displayed via a user interface at the ERT member's user device. An ERT member can select the group chat icon 1210 at any time after the emergency response application 126 has been activated or launched. In addition, other employees can also select the group chat icon 1210 if they are the employee that submitted a request for help. The group chat page 1220 provides a forum that allows the employee who submitted the request for help and the ERT members to communicate with each other as a group. As such, in one embodiment, the emergency response application 126 can publish messages within the group chat page 1220 from employees, ERT members and other emergency responders. For example, in one implementation, the emergency response application 126 can publish any messages from the employee who submitted a request for help and the ERT responder-members who are involved in responding to that request for help.

The group chat page 1220 along with other features, such as the notifications page 1020 and interactive floorplans, can help ERT members efficiently coordinate their response to an employee's request for help.

FIG. 13 is a flow diagram of an exemplary method 1300 performed by an emergency response application when an order to evacuate the facility is issued to employees including ERT members in accordance with an embodiment. The method 1300 will be described with reference to FIGS. 1 through 3 and FIGS. 14A-14C that illustrate different screen shots of a user interface of a user device in accordance with an exemplary implementation of the disclosed embodiments. It should be appreciated that the examples in FIGS. 14A-14C are non-limiting and simply illustrate exemplary implementations.

As explained above, the emergency response application 126 can continuously monitor the locations of all the user devices 112 that are located within a geofenced region that corresponds to the boundaries of the facility. When the emergency response application 126 receives an indictor (e.g., message, command or instruction) that indicates that employees have been ordered to evacuate the facility, the method 1300 begins at 1302, where the emergency response application 126 generates an alert message that is sent or pushed to user devices of all of the employees that are located in the facility (e.g., have or are associated with user devices 112 that are located within a geofenced region that corresponds to the boundaries of the facility). The alert message indicates to the employees that all of the employees are to evacuate the facility.

At 1304, as was described above with reference to step 704 of FIG. 7, the emergency response application 126 can determine which ERT members team want to respond and help evacuate the facility. For example, as shown in FIG. 14A, the emergency response application 126 can present an alert message 1410 via the user interface of a user device of each ERT member. The alert message can give each ERT member an option to dismiss (via button 1420) a request to help evacuate the facility, or confirm (via button 1430) that member wants to respond and help evacuate the facility. Any ERT member team who confirms that he/she wants to respond and help evacuate the facility (by selecting button 1430) are referred to below as a "ERT responder-member."

Although all employee should evacuate when they receive the alert message, in some cases, an employee may be unable to evacuate or may choose to ignore the order to evacuate. To assist ERT responder-members in determining which employees are still located in the facility, at 1306, the emergency response application 126 can generate and continuously update a floorplan that is presented via a user interface of the user devices 112 of ERT responder-members. An example of a floorplan is shown in FIG. 14B. The floorplan helps the ERT responder-members identify any employee that remain in the facility on a particular floor.

In one embodiment, the floorplan includes icons that represent the locations of all user devices 112 on a particular floor located within the facility that ERT responder-member is in proximity to or located on. Certain icons that represent locations of the user devices 112 of any ERT responder-members who are present on that particular floor of the facility in a way that is distinguishable from icons that represent locations of the user devices 112 of regular employees who are present on that particular floor of the facility, which are distinguishable from icons that represent locations of any exits on that particular floor of the facility, etc. In this particular example shown in FIG. 14B, the floorplan also shows seven icons 1440, 1450 that represent the locations of user devices, where the user devices of the employees are represented by five icons 1440, and where user devices of the ERT responder-members are represented via two icons 1450 that have different symbols for purposes of differentiating between regular employees and ERT responder-members.

As described above, the emergency response application 126 continuously updates the positions of the icons within the floorplan. Thus, as the evacuation takes place, positions of the icons that represent the locations of the user devices 112 of the employees and any ERT responder-members (who are still present on that particular floor of the facility) will be updated so that the ERT responder-members can quickly and easily determine who remains inside the facility on that floor. In the event all of the ERT responder-members have left a particular floor of the facility, then the floorplan and information regarding employees who remain on that particular floor can be sent to all ERT members so that they can act on or provide that information to others who are involved in the evacuation process.

For example, in one embodiment, at 1308, any of the ERT members can input information that indicates identity and location of any employee(s) who has/have not complied with the evacuation order. For instance, in one embodiment, any ERT member can select via a user interface of their user device an icon or button displayed within the floorplan that represents and identifies any employee who has not complied with the evacuation order.

In response to that information, at 1310, the emergency response application 126 can automatically generate a message that identifies the particular employee who has not evacuated in compliance with the evacuation order, and send this message to emergency responders. Depending on the implementation, the emergency response application 126 can automatically send this message to ERT responder-members, all ERT members, and/or emergency services responders (e.g., police, firemen, etc.) who are (or will be) assisting with the evacuation of the facility. A non-limiting example of the message is shown in FIG. 14C. In this example, the message 1460 includes a photo or picture that identifies the non-compliant employee, the name of the non-compliant employee, title of the non-compliant employee, and emergency contact information for the non-compliant employee; however, it should be appreciated that the message 1460 can also include any other identification or personal information associated with that non-compliant employee that is not illustrated in FIG. 14C for sake of simplicity. Although not illustrated, this message 1460 can include other information associated with that non-compliant employee such as the current location of that non-compliant employee within the facility, the normal desk or office location of that non-compliant employee within the facility, etc.

FIG. 15 illustrates a block diagram of an example environment 1510 where a database service might be used, and which may be used to implement the embodiments described herein. Environment 1510 may include user devices 1512, network 1514, system 1516, processor system 1517, application platform 1518, network interface 1520, tenant data storage 1522, system data storage 1524, program code 1526, and process space 1528. In other embodiments, environment 1510 may not have all of the components listed and/or may have other elements instead of, or in addition to, those listed above.

Environment 1510 is an environment in which an on-demand database service exists. User device 1512 may be any machine or system that is used by a user to access a database user device. For example, any of user devices 1512 can be a handheld computing device, a mobile phone, a laptop computer, a work station, and/or a network of computing devices. As illustrated in FIG. 15 (and in more detail in FIG. 16) user devices 1512 might interact via a network 1514 with an on-demand database service, which is system 1516. System 1516 may also be referred to as a cloud service provider. System 1516 provides its resources to customers (e.g., end users) as a service.

An on-demand database service, such as system 1516, is a database system that is made available to outside users who do not need to necessarily be concerned with building and/or maintaining the database system, but instead may be available for more general use when the users need the database system (e.g., on the demand of the users). Some on-demand database services may store information from one or more tenants stored into tables of a common database image to form a multi-tenant database system (MTS). Accordingly, "on-demand database service 1516" and "system 1516" will be used interchangeably herein. A database image may include one or more database objects. A relational database management system (RDMS) or the equivalent may execute storage and retrieval of information against the database object(s). Application platform 1518 may be a framework that allows the applications of system 1516 to run, such as the hardware and/or software, e.g., the operating system. In an embodiment, system 1516 may include an application platform 1518 that enables creating, managing, and executing one or more applications developed for an on-demand database service, for users accessing the on-demand database service via user devices 1512, or for third party application developers accessing the on-demand database service via user devices 1512.

The users of user devices 1512 may differ in their respective capacities, and the capacity of a particular user device 1512 might be entirely determined by permissions (permission levels) for the current user. For example, where a salesperson is using a particular user device 1512 to interact with system 1516, that user device has the capacities allotted to that salesperson. However, while an administrator is using that user device to interact with system 1516, that user device has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 1514 is any network or combination of networks of devices that communicate with one another. For example, network 1514 can be any one or any combination of a local area network (LAN), wide area network (WAN), telephone network, wireless network, point-to-point network, star network, token ring network, hub network, or other appropriate configuration. As the most common type of computer network in current use is a transfer control protocol and Internet protocol (TCP/IP) network, such as the global internetwork of networks often referred to as the "Internet" with a capital "I." That network will be used in many of the examples herein. However, it should be understood that the networks used with the embodiment described herein use are not so limited, although TCP/IP is a frequently implemented protocol.

User devices 1512 might communicate with system 1516 using TCP/IP and, at a higher network level, use other common Internet protocols to communicate, such as hypertext transfer protocol (HTTP), file transfer protocol (FTP), Andrew file system (AFS), wireless application protocol (WAP), etc. In an example where HTTP is used, user device 1512 might include an HTTP client commonly referred to as a "browser" for sending and receiving HTTP messages to and from an HTTP server at system 1516. Such an HTTP server might be implemented as the sole network interface between system 1516 and network 1514, but other techniques might be used as well or instead. In some implementations, the interface between system 1516 and network 1514 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 1516, shown in FIG. 15, implements a web-based customer relationship management (CRM) system. For example, in one embodiment, system 1516 includes application servers configured to implement and execute CRM software applications as well as to provide related data, code, forms, webpages and other information to and from user devices 1512. The application servers are also configured to store to, and retrieve from, a database system related data, objects, and Webpage content. With a multi-tenant system, data for multiple tenants may be stored in the same physical database object. Tenant data may be arranged such that data of one tenant is kept logically separate from that of other tenants so that one tenant does not have access to another tenant's data, unless such data is expressly shared. In certain embodiments, system 1516 implements applications other than, or in addition to, a CRM application. For example, system 1516 may provide tenant access to multiple hosted (standard and custom) applications, including a CRM application. User (or third party application developer) software applications, which may or may not include CRM, may be supported by the application platform 1518, which manages the creation and storage of the applications into one or more database objects, and executing of the applications in a virtual machine in the process space of the system 1516. The terms "application," "software application," "software package," "software code," and "program code" are used interchangeably.

One arrangement for elements of system 1516 is shown in FIG. 15, including a network interface 1520, application platform 1518, tenant data storage 1522 for tenant data 1523, system data storage 1524 for system data 1525 accessible to system 1516 and possibly multiple tenants, program code 1526 for implementing various functions of system 1516, and a process space 1528 for executing MTS system processes and tenant-specific processes, such as running applications as part of an application hosting service. Additional processes that may execute on system 1516 include database indexing processes.

Several elements in the system shown in FIG. 15 include conventional, well-known elements that are explained only briefly here. For example, each user device 1512 could be a cellular telephone, such as a smartphone, laptop computer, tablet computer, desktop personal computer, workstation, PDA, or any wireless access protocol (WAP) enabled device or any other computing device capable of interfacing directly or indirectly to the Internet or other network connection. User device 1512 typically runs an HTTP client, e.g., a browsing program, such as Google's Chrome browser, Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user device 1512 to access, process and view information, pages and applications available to it from system 1516 over network 1514. Each user device 1512 also typically includes one or more user interface devices, such as a keyboard, a mouse, trackball, touch pad, touch screen, pen or the like, for interacting with a graphical user interface (GUI) provided by the browser on a display (e.g., a monitor screen, liquid crystal display (LCD) monitor, etc.) in conjunction with pages, forms, applications and other information provided by system 1516 or other systems or servers. For example, the user interface device can be used to access data and applications hosted by system 1516, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user device 1512 and all of its components are operator configurable using applications, such as a browser, including computer code run using a central processing unit such as an Intel Pentium® processor or the like. Similarly, system 1516 (and additional instances of an MTS, where more than one is present) and all of their components might be operator configurable using application(s) including computer code to run using a central processing unit such as processor system 1517, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 1516 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a read-only memory (ROM) or random-access memory (RAM), or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory integrated circuits (ICs)), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 1516 is configured to provide webpages, forms, applications, data and media content to user (client) systems 1512 to support the access by user devices 1512 as tenants of system 1516. As such, system 1516 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., object oriented database management system (OODBMS) or rational database management system (RDBMS)) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 16 illustrates a block diagram of another example environment 1510, which may be used to implement the embodiments described herein. Some of the elements in FIG. 16 overlap with those in FIG. 15, and therefore FIG. 16 will be described with reference to FIG. 15, and common numbering will be used for elements in FIG. 16 that are shown in FIG. 15. FIG. 16 also illustrates elements of system 1516 and various interconnections, according to one embodiment. FIG. 16 shows that user device 1512 may include processor system 1512A (analogous to processing system(s) 202 in FIG. 3), memory system 1512B (analogous to main memory 204 in FIG. 3), input system 1512C (analogous to input system(s) 216 in FIG. 3), and output system 1512D (analogous to audio output system(s) 218 and display 222 in FIG. 3). FIG. 16 shows network 1514 and system 1516. FIG. 16 also shows that system 1516 may include tenant data storage 1522, tenant data 1523, system data storage 1524, system data 1525, user interface (UI) 1630, application program interface (API) 1632, PL/Salesforce.com object query language (PL/SOQL) 1634, save routines 1636, application setup mechanism 1638, applications servers 1600$_1$-1000$_N$, system process space 1602, tenant process spaces 1604, tenant management process space 1610, tenant storage area 1612, user storage for tenant data 1614, and application metadata 1616. In other embodiments, environment 1510 may not have the same elements as those listed above and/or may have other elements instead of, or in addition to, those listed above.

User device 1512, network 1514, system 1516, tenant data storage 1522, and system data storage 1524 were discussed above in FIG. 15. Regarding user device 1512, processor system 1512A may be any combination of one or more processors. Memory system 1512B may be any combination of one or more memory devices, short term, and/or long term memory. Input system 1512C may be any combination of input devices, such as one or more keyboards, mice, trackballs, scanners, cameras, and/or interfaces to networks. Output system 1512D may be any combination of output devices, such as one or more monitors, printers, and/or interfaces to networks. As shown in FIG. 15, system 1516 may include a network interface 1520 (of FIG. 15) implemented as a set of HTTP application servers 1600, an application platform 1518, tenant data storage 1522, and system data storage 1524. Also shown is system process space 1602, including individual tenant process spaces 1604 and a tenant management process space 1610. Each application server 1600 may be configured to access tenant data storage 1522 and the tenant data 1523 therein, and system data storage 1524 and the system data 1525 therein to serve requests of user devices 1512. The tenant data 1523 might be divided into individual tenant storage areas 1612, which can be either a physical arrangement and/or a logical arrangement of data. Within each tenant storage area 1612, user storage 1614 and application metadata 1616 might be similarly allocated for each user. For example, a copy of a user's most recently used (MRU) items might be stored to user storage 1614. Similarly, a copy of MRU items for an entire organization that is a tenant might be stored to tenant storage area 1612. A UI 1630 provides a user interface and an API 1632 provides an application programmer interface to system 1516 resident processes and to users and/or developers at user devices 1512. The tenant data and the system data may be stored in various databases, such as one or more Oracle™ databases.

Application platform 1518 includes an application setup mechanism 1638 that supports application developers' creation and management of applications, which may be saved as metadata into tenant data storage 1522 by save routines 1636 for execution by subscribers as one or more tenant process spaces 1604 managed by tenant management process 1610, for example. Invocations to such applications may be coded using PL/SOQL 1634 that provides a programming language style interface extension to API 1632. Invocations to applications may be detected by one or more system processes, which manage retrieving application metadata 1616 for the subscriber, making the invocation and executing the metadata as an application in a virtual machine.

Each application server 1600 may be communicably coupled to database systems, e.g., having access to system data 1525 and tenant data 1523, via a different network connection. For example, one application server 1600$_1$ might be coupled via the network 1514 (e.g., the Internet), another application server 1600$_{N-1}$ might be coupled via a direct network link, and another application server 1600$_N$ might be coupled by yet a different network connection. Transfer control protocol and Internet protocol (TCP/IP) are typical protocols for communicating between application servers 1600 and the database system. However, it will be apparent to one skilled in the art that other transport protocols may be used to optimize the system depending on the network connection used.

In certain embodiments, each application server 1600 is configured to handle requests for any user associated with any organization that is a tenant. Because it is desirable to be able to add and remove application servers from the server pool at any time for any reason, there is preferably no server affinity for a user and/or organization to a specific application server 1600. In one embodiment, therefore, an interface system implementing a load balancing function (e.g., an F5 Big-IP load balancer) is communicably coupled between the application servers 1600 and the user devices 1512 to distribute requests to the application servers 1600. In one embodiment, the load balancer uses a least connections algorithm to route user requests to the application servers 1600. Other examples of load balancing algorithms, such as round robin and observed response time, also can be used. For example, in certain embodiments, three consecutive requests from the same user could hit three different application servers 1600, and three requests from different users could hit the same application server 1600. In this manner, system 1516 is multi-tenant, wherein system 1516 handles the storage of, and access to, different objects, data and applications across disparate users and organizations.

As an example of storage, one tenant might be a company that employs a sales force where each salesperson uses system 1516 to manage his or her sales process. Thus, a user might maintain contact data, leads data, customer follow-up data, performance data, goals and progress data, etc., all applicable to that user's personal sales process (e.g., in tenant data storage 1522). In an example of an MTS arrangement, since all of the data and the applications to access, view, modify, report, transmit, calculate, etc., can be maintained and accessed by a user device having nothing more than network access, the user can manage his or her sales efforts and cycles from any of many different user devices. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 1516 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 1516 might also maintain system level data usable by multiple tenants or other data. Such system level data might include industry reports, news, postings, and the like that are sharable among tenants.

In certain embodiments, user devices 1512 (which may be client systems) communicate with application servers 1600 to request and update system-level and tenant-level data from system 1516 that may require sending one or more queries to tenant data storage 1522 and/or system data storage 1524. System 1516 (e.g., an application server 1600 in system 1516) automatically generates one or more structured query language (SQL) statements (e.g., one or more SQL queries) that are designed to access the desired information. System data storage 1524 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the embodiments described herein. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium (also referred to as a machine-readable storage medium) for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

A "processor," "processor system," or "processing system" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline,"

" in a "batch mode," etc. Portions of processing can be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to computer programming, computer networking, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first", "second" and other such numerical terms do not imply a sequence or order unless clearly indicated by the context.

Embodiments of the subject matter may be described herein in terms of functional and/or logical block components and with reference to symbolic representations of operations, processing tasks, and functions that may be performed by various computing components or devices. Such operations, tasks, and functions are sometimes referred to as being computer-executed, computerized, software-implemented, or computer-implemented. In this regard, it should be appreciated that the various block components shown in the figures may be realized by any number of hardware, software, and/or firmware components configured to perform the specified functions.

For example, an embodiment of a system or a component may employ various integrated circuit components, e.g., memory elements, digital signal processing elements, logic elements, look-up tables, or the like, which may carry out a variety of functions under the control of one or more microprocessors or other control devices. In this regard, the subject matter described herein can be implemented in the context of any computer-implemented system and/or in connection with two or more separate and distinct computer-implemented systems that cooperate and communicate with one another.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed:

1. A method, comprising:
   monitoring, via an application at a server system, locations of user devices;
   determining, via the application at the server system in response to occurrence of a trigger event, a location of a first user device within a facility;
   determining, via the application at the server system from an employee management service that operates in conjunction with an employee database, identification information associated with a user who is associated with the first user device;
   generating, via the application at the server system, a floorplan that includes an icon that represents the location of the first user device, and the identification information associated with the user who is associated with the first user device; and
   causing the floorplan to be displayed via a user interface of a second user device.

2. A method according to claim 1, wherein the user devices are each associated with an employee, and wherein the user devices are located within a virtual boundary around a perimeter of the facility.

3. A method according to claim 1, wherein generating, comprises:
   generating, via the application at the server system working in conjunction with a facility space management module, the floorplan of a particular floor located within the facility.

4. A method according to claim 1, wherein causing comprises:
   causing, at each of a plurality of second user devices, the floorplan to be displayed via a user interface of that second user device.

5. A method according to claim 4, wherein each of the second user devices is associated with a member of an emergency response team (ERT), and further comprising:
coordinating a response by the members of the ERT based on inputs to the application via the members of the ERT.

6. A method according to claim 1, wherein the trigger event is receipt of an alert message from the first user device by the application, and further comprising:
generating the alert message in response to interaction with a user interface of the first user device, wherein the alert message indicates that the user who is associated with the first user device has requested help from the ERT;
causing a floorplan to be displayed on the user interface of the first user device, wherein the floorplan includes: the icon that represents the location of the first user device on the particular floor located within the facility, icons that represent locations of any exits on that particular floor of the facility, icons that represent locations of any emergency response equipment located on that particular floor of the facility, and icons that represent locations of the second user devices of any ERT responder-members who are present on that particular floor of the facility; and
continuously updating a position of the icon that represents the location of the first user device within the floorplan and positions of the icons within the floorplan that represent locations of the second user devices of any ERT responder-members who are present on that particular floor of the facility.

7. A method according to claim 5, wherein the trigger event is receipt of an alert message by the application from the first user device, wherein the alert message indicates that the user who is associated with the first user device has requested help from the ERT, wherein the alert message is generated in response to interaction with a user interface of the first user device, and wherein coordinating further comprises:
upon receiving the alert message at each of the plurality of second user devices, presenting via a user interface an option to each member of the ERT to confirm whether that member wants to respond to a request for help from the user who is associated with the first user device, wherein each member that confirms that member wants to respond to the request for help is an ERT responder-member;
for each ERT responder-member: displaying a floorplan on a user interface of the second user device of that ERT responder-member, wherein the floorplan includes: the icon that represents the location of the first user device on a particular floor located within the facility, icons that represent locations of any exits on that particular floor of the facility, icons that represent locations of any emergency response equipment located on that particular floor of the facility, and icons that represent locations of the second user devices of any ERT responder-members who are present on that particular floor of the facility; and
continuously updating a position of the icon that represents the location of the first user device within the floorplan and positions of the icons within the floorplan that represent locations of the second user devices of any ERT responder-members who are present on that particular floor of the facility.

8. A method according to claim 7, wherein coordinating further comprises:

displaying a role assignment screen on a user interface of the second user device of each ERT responder-member, wherein the role assignment screen prompts each ERT responder-member to select their role in responding to the request for help;
assigning each ERT responder-member a role in responding to the request for help based on a selection by that ERT responder-member via interaction with the role assignment screen;
generating, via the application, a plurality of entries each comprising the role of each ERT responder-member in responding to the request for help; and
publishing, via the application, the entries that describe the role of each ERT responder-member in a notifications feed page.

9. A method according to claim 8, wherein coordinating further comprises:
publishing messages, via the application, in the notifications feed page, wherein the messages comprise: any notifications regarding status of the user or the ERT responder-members; and any activity information about ERT responder-members involved in responding to this request for help.

10. A method according to claim 7, wherein coordinating further comprises:
publishing, via the application, messages in a group chat page, wherein the messages comprise: any messages from the user and the ERT responder-members.

11. A method according to claim 1, wherein determining a location of a first user device within the facility, further comprises:
determining the location of the first user device within the facility based on global positioning system (GPS) coordinates of the first user device and floor information that indicates which floor of the facility the first user device is located on, wherein the floor information is determined by the application based on information from the first user device that identifies at least one beacon that has a known location within the facility.

12. A method according to claim 5, wherein the trigger event is receipt of an indicator by the application that indicates that employees are to evacuate the facility, and wherein determining further comprises:
determining, in response to occurrence of the trigger event, locations of a plurality of first user devices within the facility; and
further comprising:
sending, via the application, an alert message that indicates that employees who are located in the facility are to be evacuated, wherein each of the employees is associated with one of the first user devices;
wherein coordinating further comprises:
upon receiving the alert message at each of a plurality of second user devices, presenting via a user interface at each of the second user devices an option to each member of the ERT to confirm whether that member wants to respond to a request to help evacuate the facility, wherein each member that confirms that member wants to respond to the request is an ERT responder-member;
for each ERT responder-member: displaying a floorplan on a user interface of the second user device of that ERT responder-member, wherein the floorplan includes: icons that represent the locations of the first user devices on a particular floor located within the facility that is in proximity to that ERT responder-member, icons that represent locations of any exits on that particular floor of the facility, and icons that represent locations of the second user devices of any ERT responder-members who are present on that particular floor of the facility;

continuously updating, within the floorplan, positions of the icons that represent the locations of the first user devices and positions of the icons that represent locations of the second user devices of any ERT responder-members who are still present on that particular floor of the facility;

generating, via the application in response to input from one of the ERT responder-members, a message that identifies a particular employee who has not evacuated in compliance with the evacuation order and that provides a location of that employee within the facility, wherein the input from one of the ERT responder-members includes selecting an icon that identifies that particular employee via a user interface of the second user device associated with that ERT responder-member; and sending the message to an emergency services responder who will be assisting with evacuation of the facility.

13. A server system comprising a processor and a memory, wherein the memory comprises computer-executable instructions that are capable of execution by the processor, and that when executed by the processor, cause the server system to:

monitor locations of user devices;

determine, in response to occurrence of a trigger event, a location of a first user device within a facility;

determine identification information associated with a user who is associated with the first user device from an employee management service that operates in conjunction with an employee database;

generate a floorplan that includes an icon that represents the location of the first user device and the identification information associated with the user who is associated with the first user device; and cause the floorplan to be displayed at a user interface of a second user device.

14. A server system according to claim 13, wherein the user devices are user devices of employees that have been determined to be located within a virtual boundary around a perimeter of a facility, wherein the user is an employee and wherein the identification information is determined based on employee metadata.

15. A server system according to claim 13, wherein the floorplan is of a particular floor located within the facility and is generated based on facilities metadata, and wherein the floorplan is displayed at a user interface of each of a plurality of second user devices each being associated with a member of an emergency response team (ERT).

16. A server system according to claim 15, wherein the computer-executable instructions that are capable of execution by the processor, and that when executed by the processor, further cause the server system to:

coordinate a response by members of the ERT in response to inputs from the members of the ERT.

17. A server system according to claim 13, wherein the trigger event is receipt of an alert message from the first user device, wherein the alert message indicates that the employee who is associated with the first user device has requested help from the ERT, wherein the floorplan further includes: icons that represent locations of any exits on that particular floor of the facility, icons that represent locations of any emergency response equipment located on that particular floor of the facility, and icons that represent locations of the second user devices of any ERT responder-members who are present on that particular floor of the facility, and wherein the computer-executable instructions further cause the server system to:

continuously update a position of the icon that represents the location of the first user device within the floorplan and positions of the icons within the floorplan that represent locations of the second user devices of any ERT responder-members who are present on that particular floor of the facility;

generate a notifications feed page that includes information regarding a role of each ERT responder-member in responding to the request for help, any notifications regarding status of the employee or the ERT responder-members; and any activity information about ERT responder-members involved in responding to this request for help; and generate a group chat page that publishes any messages from the employee and the ERT responder-members while the request for help is active.

18. A server system according to claim 14, wherein the trigger event is receipt of an indicator that indicates that employees are to evacuate the facility, and wherein the computer-executable instructions further cause the server system to:

determine locations of a plurality of first user devices within the facility in response to occurrence of the trigger event, and send an alert message that indicates that employees who are located in the facility are to be evacuated, wherein each of the employees is associated with one of the first user devices, wherein the floorplan includes: icons that represent the locations of each of the first user devices on a particular floor located within the facility that is in proximity to that ERT responder-member, icons that represent locations of any exits on that particular floor of the facility, icons that represent locations of any emergency response equipment located on that particular floor of the facility, and icons that represent locations of the second user devices of any ERT responder-members who are present on that particular floor of the facility;

continuously update a position of the icon that represents the location of the first user device within the floorplan and positions of the icons within the floorplan that represent locations of the second user devices of any ERT responder-members who are still present on that particular floor of the facility;

generate, in response to selection of an icon that identifies that particular employee by one of the ERT responder-members, a message that identifies a particular employee who has not evacuated in compliance with the evacuation order and that provides a location of that employee within the facility; and send the message to an emergency services responder who will be assisting with evacuation of the facility.

19. A system, comprising:

a first user device;

a second user device associated with a member of an emergency response team (ERT);

a server system configurable to host an application configurable to interface with the first and second user devices, wherein the application is configurable to:

monitor locations of the first user device;

determine, in response to occurrence of a trigger event, a location of a first user device within a facility;

determine identification information associated with a user who is associated with the first user device from an employee management service that operates in conjunction with an employee database;

generate a floorplan of a particular floor located within the facility that includes an icon that represents the location of the first user device and the identification information associated with the user who is associated with the first user device; and cause the second user device to display the floorplan via a user interface.

* * * * *